US008650605B2

(12) United States Patent
Zinevich

(10) Patent No.: US 8,650,605 B2
(45) Date of Patent: Feb. 11, 2014

(54) LOW-COST LEAKAGE DETECTOR FOR A DIGITAL HFC NETWORK

(75) Inventor: Victor M. Zinevich, Voronezh (RU)

(73) Assignee: ARCOM Digital, LLC, Syracuse, NY (US)

( * ) Notice: Subject to any disclaimer, the term of this patent is extended or adjusted under 35 U.S.C. 154(b) by 57 days.

(21) Appl. No.: 13/456,950

(22) Filed: Apr. 26, 2012

(65) Prior Publication Data

US 2013/0291044 A1 Oct. 31, 2013

(51) Int. Cl.
*H04N 7/173* (2011.01)
(52) U.S. Cl.
USPC ............ 725/111; 725/107; 348/180; 348/192
(58) Field of Classification Search
USPC .......................... 725/107, 111; 348/180, 192
See application file for complete search history.

(56) References Cited

U.S. PATENT DOCUMENTS

| 4,072,899 | A | | 2/1978 | Shimp |
| 4,613,867 | A | | 9/1986 | Golinsky |
| 5,294,937 | A | * | 3/1994 | Ostteen et al. ............... 342/459 |
| 5,327,144 | A | | 7/1994 | Stilp et al. |
| 5,371,760 | A | | 12/1994 | Allen et al. |
| 5,454,720 | A | | 10/1995 | FitzGerald et al. |
| 5,493,210 | A | | 2/1996 | Orndorff et al. |
| 5,608,428 | A | | 3/1997 | Bush |
| 5,633,582 | A | | 5/1997 | Orndorff et al. |
| 5,752,164 | A | | 5/1998 | Jones |
| 5,777,662 | A | | 7/1998 | Zimmerman |
| 5,982,165 | A | | 11/1999 | Bowyer et al. |
| 5,990,687 | A | | 11/1999 | Williams |
| 6,005,518 | A | | 12/1999 | Kallina |
| 6,009,334 | A | | 12/1999 | Grubeck et al. |
| 6,018,358 | A | | 1/2000 | Bush |

(Continued)

FOREIGN PATENT DOCUMENTS

| EP | 0930734 A1 | 7/1999 |
| JP | 2004-032106 A1 | 1/2002 |

(Continued)

OTHER PUBLICATIONS

Al Harbi, Fatima S. & Helgert, Hermann J., An Improved Chan-Ho Location Algorithm for TDOA Subscriber Position Estimation, IJCSNS Int'l. Journal of Computer Science and Network Security, vol. 10 No. 9, Sep. 2010, pp. 101-104.

(Continued)

*Primary Examiner* — Pankaj Kumar
*Assistant Examiner* — Charles N Hicks
(74) *Attorney, Agent, or Firm* — Lawrence P. Trapani, Esq.

(57) ABSTRACT

A handheld leakage detector for finding digital QAM signal leaks in a HFC network, comprises a radio receiver, a leakage receiver, leakage sampler, a correlator, and a display. The radio receiver receives samples of the QAM signal taken from the HFC network, called "reference samples." The leakage receiver receives a QAM leakage signal, which is related to the QAM signal from the HFC network. The leakage sampler samples the leakage signal to form leakage samples. The correlator performs a coherent cross-correlation of the reference samples and the leakage samples, to produce a correlation peak. A value is determined from the correlation peak and displayed on the display. The value generally becomes more optimized as the detector approaches the leak. The leak is sought by iteratively changing the position of the detector until the displayed value becomes substantially optimized or the leak is found.

37 Claims, 9 Drawing Sheets

(56) References Cited

U.S. PATENT DOCUMENTS

| | | | |
|---|---|---|---|
| 6,041,076 | A | 3/2000 | Franchville et al. |
| 6,118,975 | A | 9/2000 | Bowyer et al. |
| 6,141,542 | A | 10/2000 | Kotzin et al. |
| 6,272,350 | B1 | 8/2001 | Tekinay |
| 6,278,485 | B1 | 8/2001 | Franchville et al. |
| 6,307,593 | B1 | 10/2001 | Bowyer et al. |
| 6,310,646 | B1 | 10/2001 | Shi et al. |
| 6,313,874 | B1 | 11/2001 | Bowyer et al. |
| 6,405,043 | B1 | 6/2002 | Jensen et al. |
| 6,522,890 | B2 | 2/2003 | Drane et al. |
| 6,600,515 | B2 | 7/2003 | Bowyer et al. |
| 6,611,150 | B1 | 8/2003 | Stevens |
| 6,774,839 | B2 | 8/2004 | Talbot et al. |
| 6,801,162 | B1 | 10/2004 | Eckenroth et al. |
| 6,804,826 | B1 | 10/2004 | Bush et al. |
| 6,833,859 | B1 | 12/2004 | Schneider et al. |
| 6,978,476 | B2 | 12/2005 | Zimmerman |
| 7,176,831 | B2 | 2/2007 | Dibble et al. |
| 7,360,124 | B2 | 4/2008 | Bouchard |
| 7,395,548 | B2 | 7/2008 | Runzo |
| 7,408,509 | B2 | 8/2008 | Karlsson et al. |
| 7,467,049 | B2 | 12/2008 | Hayes et al. |
| 7,519,454 | B2 | 4/2009 | Gardner et al. |
| 7,548,201 | B2 | 6/2009 | Eckenroth et al. |
| 7,657,928 | B2 | 2/2010 | Shima et al. |
| 7,873,322 | B2 | 1/2011 | Flask et al. |
| 7,945,939 | B2 | 5/2011 | Eckenroth et al. |
| 7,952,363 | B2 | 5/2011 | Jones et al. |
| 8,112,669 | B2 | 2/2012 | Zimmerman |
| 8,143,900 | B2 | 3/2012 | Shimp et al. |
| 8,154,303 | B2 | 4/2012 | Maxson et al. |
| 2002/0094785 | A1 | 7/2002 | Deats |
| 2003/0040277 | A1 | 2/2003 | Deats |
| 2004/0174309 | A1 | 9/2004 | Terreault et al. |
| 2004/0245995 | A1 | 12/2004 | Williams |
| 2005/0034170 | A1 | 2/2005 | Bush et al. |
| 2006/0063511 | A1 | 3/2006 | Shima et al. |
| 2006/0179355 | A1 | 8/2006 | Bouchard |
| 2006/0248564 | A1 | 11/2006 | Zinevitch |
| 2006/0248565 | A1* | 11/2006 | Shimp et al. ............ 725/123 |
| 2007/0022457 | A1 | 1/2007 | Eckenroth et al. |
| 2008/0033698 | A1 | 2/2008 | Stelle |
| 2008/0133308 | A1 | 6/2008 | Harris |
| 2008/0167808 | A1 | 7/2008 | Harris et al. |
| 2009/0096665 | A1 | 4/2009 | Maxson et al. |
| 2009/0217325 | A1 | 8/2009 | Kliger et al. |
| 2009/0267615 | A1 | 10/2009 | Jones et al. |
| 2010/0026310 | A1 | 2/2010 | Shimp et al. |
| 2010/0045471 | A1 | 2/2010 | Meyers |
| 2011/0043640 | A1 | 2/2011 | Zinevich |
| 2011/0055632 | A1 | 3/2011 | Zimmerman |
| 2011/0085456 | A1 | 4/2011 | Zimmerman |
| 2011/0267474 | A1 | 11/2011 | Sala et al. |
| 2012/0042213 | A1 | 2/2012 | Zimmerman |
| 2012/0086865 | A1 | 4/2012 | Bush et al. |
| 2012/0257661 | A1 | 10/2012 | Murphy et al. |

FOREIGN PATENT DOCUMENTS

| | | |
|---|---|---|
| JP | 2002-186012 A1 | 6/2002 |
| JP | 2004-109139 A1 | 4/2004 |
| JP | 2006-080681 A1 | 3/2006 |
| WO | WO2008151057 B2 | 12/2008 |
| WO | WO2009138776 A2 | 11/2009 |
| WO | WO2013003301 A1 | 1/2013 |

OTHER PUBLICATIONS

Tresness, Gregory A., Detecting Leakage of Digital Channels in an HFC Network, ARCOM Digital White Paper, Jan. 2011, pp. 1-6.

Trilithic, Inc., Seeker GPS Leakage Detector Datasheet, Trilithic, Inc., Sep. 23, 2009, pp. 1-2.

Comsonics, Inc., Cybertek Qualifier Sales Sheet, ComSonics, Inc., Oct. 3, 2003/Nov. 18, 2011, pp. 1-2.

Comsonics, Inc., Qualifier X-Ray Sales and Specification Sheets, ComSonics, Inc., Jan. 1, 2009, pp. 1-4.

Powers, Robert S., et al., Airspace Fields Due to Signal Leakage From Cable Television Systems, IEEE Transactions on Cable Television, vol. CATV-5, No. 4, Oct. 1980, pp. 169-89.

Torrieri, Don J., Statistical Theory of Passive Location Systems, IEEE Transactions on Aerospace and Electronic Systems, vol. AES-20, No. 2, Mar. 1984, pp. 183-98.

Livermore, Sandy B., Quantifying Signal Leakage—How Do Current Methods Measure Up?, IEEE Transactions on Consumer Electronics, vol. CE-30, No. 3, Aug. 1984, pp. 503-509.

Handler, F.; Karabelnik, J., CATV Leakage Control Using a GPS Based System, IEEE Electromagnetic Compatibility, 1992, From a Unified Region to a Unified World, 1992 Regional Symposium on Tel-Aviv, Israel Nov. 2-5, 1992, pp. 2.2.4/1-6 (whole document).

Doppler Systems Inc., Locating Cable TV Leaks Using Doppler Radio Direction Finding Systems, A Technical Application Note from Doppler Systems Inc., Mar. 15, 1994, http://www.dopsys.com/appnotes/ctv.html, pp. 1-6.

Chan, Y.T. and Ho, K.C., A Simple and Efficient Estimator for Hyperbolic Location, IEEE Transactions on Signal Processing, vol. 42, No. 8, Aug. 1994, pp. 1905-1915.

Aatique, Muhammad, Evaluation of TDOA Techniques for Position Location in CDMA Systems, Virginia Polytechnic Institute and State University, Master of Science in Electrical Engineering Thesis, Sep. 1997, pp. 1-125 (See also, pp. 6, 16, & 13-37).

International Telecommunication Union (ITU), Radiocommunication Bureau, Handbook Spectrum Monitoring, Edition 2002 (Aug. 20, 2002), pp. vii, 44-45, 55, 137-63, 211-13, 228, 302-30 & 506-22.

Hranac, Ron, Broadband: Signal Leakage in an All-Digital Network, Communications Technology Column, Feb. 1, 2009, http://www.cable360.net/ct/operations/bestpractices/33882.html, entire work.

Cable360.net, Leakage in an All-Digital World: Heavy Hitters Weigh In, Communications Technology Column, Mar. 1, 2009, http://www.cable360.net/ct/deployment/techtrends/34303, entire work.

Hranac, Ron, Broadband: Signal Leakage in an All-Digital Network: The Continuing Story, Communications Technology Column, May 1, 2009, http://www.cable360.net/print/ct/sections/-columns/broadband/35443.html, entire work.

International Search Report for PCT/US2010/044160 (counterpart to U.S. Appl. No. 12/583,263), Jan. 14, 2011, pp. 1-6.

Written Opinion of the International Searching Authority for PCT/US2010/044160 (counterpart to U.S. Appl. No. 12/583,263), Jan. 14, 2011, pp. 1-14.

\* cited by examiner

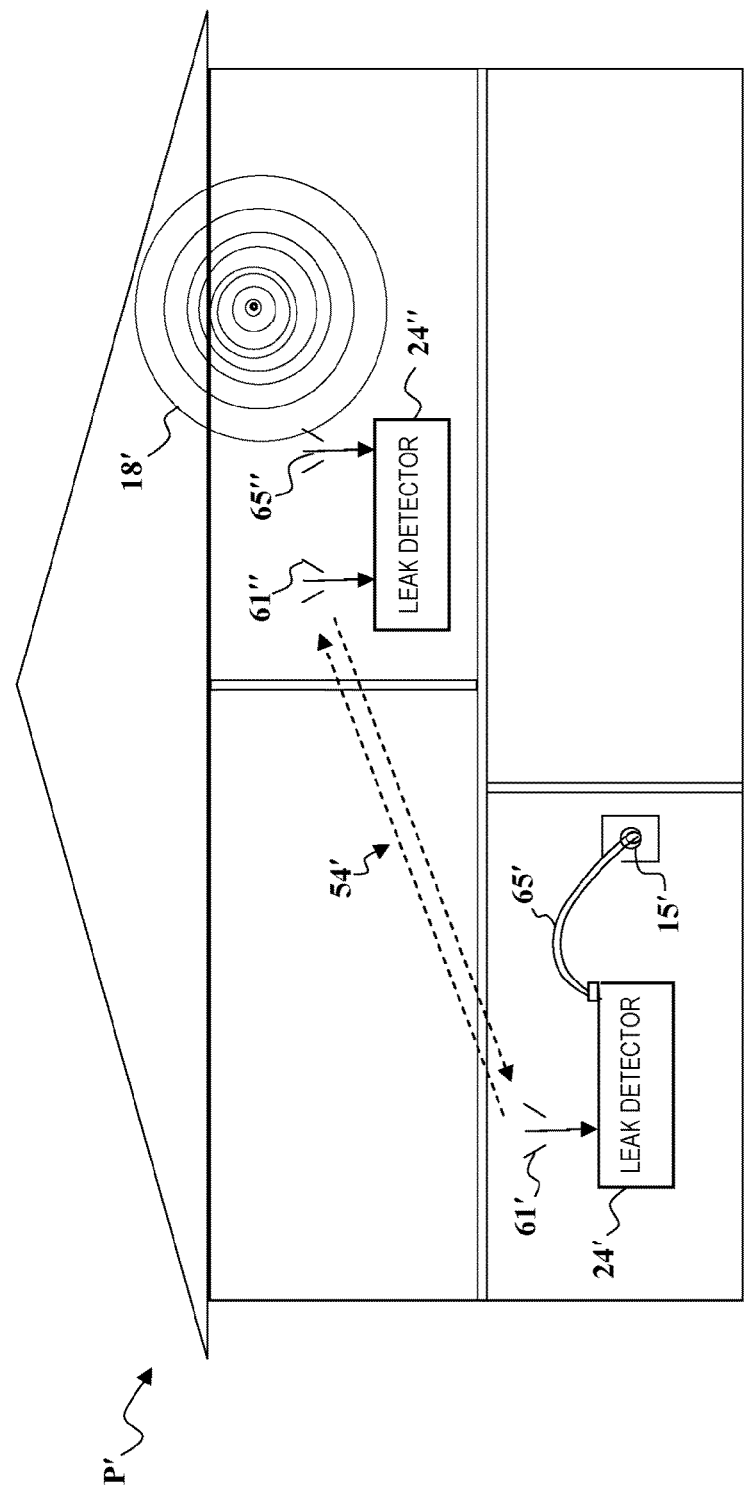

LOW-COST LEAKAGE DETECTOR FOR A DIGITAL HFC NETWORK

CROSS-REFERENCE TO RELATED APPLICATIONS

This application is related to pending application Ser. No. 12/583,263, filed Aug. 18, 2009, published Feb. 24, 2011 under Publication No. 2011/0043640, which is incorporated herein by reference, and to which no priority claim is made.

BACKGROUND OF THE INVENTION

1. Field of Invention

The present invention relates generally to the detection of leakage signals and the location of leaks, and more particularly to a low-cost leakage detector and method for detecting digital signals leaking from the coaxial portion of a hybrid fiber-coax (HFC) network and for locating the leaks.

2. Background Art

The detection of digital signals leaking from an HFC network and the location of the leaks are very important tasks for controlling the ingress and egress of the HFC network, such as a cable television network.

Known methods of leakage detection and location in HFC networks have involved the detection of existing analog TV carrier signals or special pilot signal inserted into the network. Such methods may also include some of tag signal or modulation imposed on the analog TV carrier or pilot signal to mark the detected signal as leakage originating from the HFC network. Examples of using an analog TV carrier are disclosed in the following patent documents: Pub. App. No. 2008/0133308 (Jun. 5, 2008) to Harris; Pub. App. No. 2008/0033698 (Feb. 7, 2008) to Stelle; Pub. App. No. 2007/0022457 (Jan. 25, 2007) to Eckenroth et al.; U.S. Pat. No. 7,548,201 to Eckenroth et al.; U.S. Pat. No. 7,395,548 to Runzo; U.S. Pat. No. 6,801,162 to Eckenroth et al.; Pub. App. No. 2006/0248565 (Nov. 2, 2006) to Shimp et al.; U.S. Pat. No. 6,833,859 to Schneider et al.; U.S. Pat. No. 6,313,874 to Bowyer et al.; and U.S. Pat. No. 5,777,662 to Zimmerman. Examples of using an inserted pilot signal are found in the following patents: U.S. Pat. No. 6,600,515 to Bowyer et al.; and U.S. Pat. No. 4,072,899 to Shimp. The use of tag signals in connection with analog TV carriers or pilots signals are disclosed in the following patent documents: U.S. Pat. No. 6,804,826 to Bush et al.; U.S. Pat. No. 6,600,515 to Bowyer et al.; and U.S. Pat. No. 6,018,358 to Bush.

The known methods have limitations in cases where the HFC network contains only digital signals, such as quadrature amplitude modulation (QAM) signals (an "all-digital network"). Many modern all-digital networks do not have analog channels (or analog carriers) and do not have unused bandwidth for test signals or pilot carriers. Current analog detection techniques are not effective for leaks of QAM television signals or other digital TV signals, because such leakage signals look like noise. Thus, if such analog techniques are to be used in an all-digital network, expensive bandwidth will need to be allocated for transmitting analog carriers or pilot signals to be detected as leakage signals. The use of a QAM receiver to detect a QAM leakage signal may initially seem to be a solution, but such receivers usually require a carrier-to-noise ratio (CNR) of better than 20 dB for demodulation. QAM leakage signals typically have a CNR that is significantly lower than 20 dB.

The problem of detecting leakage in an all-digital network is described in the following articles by Ron Hranac: "Broadband: Signal leakage in all-digital network" http://www.cable360.net/ct/operations/bestpractices/33882.html (Feb. 1, 2009) and "Broadband: Signal leakage in all-digital network: Continuing story" http://www.cable360.net/ct/sections/-columns/broadband/35443.html (May 1, 2009). Also the problem is discussed in the publication, "Leakage in all-digital World" http://www.cablefax.com/technology/strategy/-Leakage-in-an-All-Digital-World__34303.html (Mar. 1, 2009).

Copending application Ser. No. 12/583,263, published as U.S. Patent Application Publication No. 2011/0043640 (Feb. 24, 2011), filed by the inventor herein, discloses a system for detecting and locating digital signals (e.g., QAM television signals) leaking from an HFC network. To achieve detection of such low level digital, noise-like signals, and ultimately to locate them, the system employs coherent cross-correlation. Samples of the digital signal carried on the HFC network ("reference samples") are coherently cross-correlated with samples of the same signal leaking from the HFC network into free-space ("leakage samples"). The reference samples are generated by a headend or reference unit connected to the HFC network and the leakage samples are generated by a leakage detector unit that receives the leaked signal from free-space. Coherent cross-correlation requires synchronization of the reference and leakage samples. Synchronization is achieved by using the clock signal, seconds or sync pulses, and timestamps (collectively, "synchronizing signals") from a satellite navigation system, such as the Global Positioning System (GPS). The reference and detector units include receivers for receiving the synchronizing signals. Cross-correlation is usually performed in the detector unit, which receives the reference samples via a communicate link such as, e.g., a mobile wireless network connection. The detector unit is usually mounted in a service vehicle which travels along the HFC network to locate the leak.

The system described in copending application Ser. No. 12/583,263 quickly and accurately identifies a particular subscriber premises or network device, or a few candidate network devices, as the source of the leak. If a few candidate devices are identified, it may be desirable to manually search on foot along a street (or up a pole) with the leakage detector to pinpoint or confirm a particular leaking network device or other leak location. If a subscriber's premises is identified as the source of the leak, it may be desirable to manually search inside or around the premises to find the leak. To conduct such manual searches, the leakage detector would have to be removed from the service vehicle. Such removal can be inconvenient and time consuming. It can be inconvenient because the detector must be dismounted from a bracket and disconnected from vehicle-mounted antennas and reconnected to mobile antennas. It can be time consuming because the leakage detector may lose acquisition of the satellite navigation system when switching antennas and it will take time to reacquire the satellite. Moreover, if the detector is to be taken inside a dwelling, it is also likely to lose acquisition of the satellite system, making it difficult or impossible to perform coherent cross-correlation.

One possible solution to the above problem is to carry a second leakage detector in the vehicle, which is already connected to mobile antennas. However, the second detector will still need time to acquire the satellite system and can only be used for an outside application. Further, a duplicate leakage detector and the original each contain a satellite receiver and mobile wireless modem with a paid data plan and each has a not so insignificant overall unit cost. Thus, the use of a duplicate unit is unattractive from a cost standpoint. Accordingly, there exists a need for a more flexible and cost effective solution to extending the reach of the leakage detection system of copending application Ser. No. 12/583,263, for on foot, manual leakage searches along a street, up a pole, or in and around a subscriber's premises.

Recently, there has been an initiative by some cable television system operators to check a subscriber's premises for signal leaks when a technician or installer visits the subscriber to make a repair or install equipment. This initiative is part of an overall maintenance program referred to as "home certification." In the past, conventional low-cost signal strength meters were used to find analog signal leaks in subscribers' premises. However, cable operators currently offer television programming almost exclusively in digital format, and in particular, in the QAM signal format. Such signal strength meters are not suitable for detecting such digital signals. Thus, the home certification program has generated an urgent need for a low-cost meter that can reliably detect and locate digital TV signal leaks inside a subscriber's premises.

OBJECTS AND SUMMARY OF THE INVENTION

It is therefore an object of the present invention to provide apparatus and methods for detecting and locating digital signal leakage that overcome the above-mentioned problems.

It is another object of the present invention to provide apparatus and methods for detecting leakage signals and locating leaks in an all-digital network.

It is a further object of the present invention to provide apparatus and methods for identifying or confirming a source of a digital signal leak among a plurality of candidate sources.

It is still another object of the present invention to provide apparatus and methods for detecting and locating a digital signal leak in or around a subscriber's premises.

It is still a further object of the present invention to provide apparatus and methods for searching on foot, along a street or other area or up a utility pole for a digital signal leak and finding the leak.

It is yet another object of the present invention to provide leakage detection and location apparatus and methods for use inside a subscriber's premises, the operation of which are based on synchronizing signals from a satellite navigation system.

It is yet a further object of the present invention to provide synchronizing signals from a satellite navigation system to a low-cost leakage detector over a simple and inexpensive communications link.

It is still yet another object of the present invention to provide a low-cost leakage detector which can be conveniently deployed from a service vehicle into the field to manually search on foot for a digital signal leak.

It is still yet a further object of the present invention to provide apparatus and methods for detecting and locating leakage of digital TV signals such as, e.g., 64-QAM, 256-QAM, and 8-VSB signals.

In the present invention, QAM or other digital leakage signals are detected by using coherent cross-correlation in a field-deployed leakage detector. A cross-correlation function or peak is generated from the cross-correlation between samples of a digital signal that leaked from a cable network and samples of the same digital signal taken from a reference point in the cable network. The latter samples (or reference samples) are transmitted to the leakage detector by way of a radio relay station or communications bridge or by a direct radio communications path. Coherent cross-correlation is achieved by synchronizing the formation of the reference and leakage samples to a common clock and preferably using timestamps.

In accordance with one embodiment of the present invention, there is provided a system for finding a leak in a coaxial cable portion of a HFC network carrying a digital signal having a signal part. The leak emits the digital signal including the signal part into free space as a leakage signal. The system comprises a reference subsystem, a field-deployable subsystem, and a low-cost handheld leakage detector. The reference subsystem is adapted to be coupled to the HFC network and includes a first navigation receiver, a digital signal receiver, a reference sampler, and a reference modem. The first navigation receiver is adapted to receive from a navigation system a reference clock signal having a clock frequency. The digital signal receiver is adapted to be coupled to the HFC network to receive the digital signal including the signal part. The reference sampler is coupled to the first navigation receiver and the digital signal receiver. The reference sampler is adapted to sample the signal part of the digital signal in synchronism with the reference clock, to form a set of reference samples. The reference modem is adapted to deliver the set of reference samples to a first communications link, which includes a mobile wireless network.

The field-deployable subsystem includes a second navigation receiver, a frequency divider, a wireless modem, and a radio transmitter. The second navigation receiver is adapted to receive from the navigation system the reference clock signal. The frequency divider is coupled to the second navigation receiver and is adapted to divide the frequency of the reference clock signal down to a lower frequency, to form a slower clock signal. The wireless modem is adapted to receive the set of reference samples from the mobile wireless network of the first communications link. The radio transmitter is coupled to the frequency divider and wireless modem. The radio transmitter is adapted to transmit the slower clock signal and the reference samples over a relatively short-range, radio communications path.

The low-cost handheld leakage detector includes a radio receiver, a local clock generator, a leakage receiver, a leakage sampler, a correlator that produces a correlation peak, a processor for determining a value related to the correlation peak, and a display or indicator device for displaying or otherwise indicating the value. The leakage detector does not include a navigation receiver for a navigation system. The radio receiver of the leakage detector is adapted to receive from the short-range radio communications path the slower clock signal and the set of reference samples. The local clock generator is coupled to the radio receiver and is adapted to generate a local clock signal from the slower clock signal. The local clock signal has a frequency substantially equal to the frequency of the reference clock signal and is substantially phase-locked to the reference clock signal. The leakage receiver is adapted to receive from free space, at a detection position, the leakage signal including the signal part. The leakage sampler is coupled to the leakage receiver and the local clock generator. The leakage sampler is adapted to sample the leakage signal including the signal part in synchronism with the local clock signal, to form a set of leakage samples. The correlator is adapted to perform a coherent cross-correlation of the set of reference samples and the set of leakage samples, to produce a correlation peak characterized by a parameter. The processor is associated with the correlator and determines a value related to the parameter of the correlation peak. The display or indicator device displays or otherwise indicates the value. The value generally becomes more optimized as the detection position approaches the leak.

The leak is found by iteratively changing the detection position relative to the leak while operating the system until the value is substantially optimized.

A method of finding a digital signal leak in a coaxial cable portion of a HFC network is also an aspect of the present invention. The HFC network carries a digital signal having a signal part and the leak emits the digital signal including the signal part into free space as a leakage signal. In one exemplary embodiment, the method comprises the steps of: (a) at a local position, receiving from a reference point in the HFC network the signal part of the digital signal; (b) at the local position, receiving from a navigation system a reference clock signal having a frequency; (c) sampling in synchronism with the reference clock signal the signal part of the digital signal, to form a set of reference samples; (d) at the local position, transmitting the set of reference samples over a first communications link which includes a mobile wireless network; (e) at a remote position along the HFC network, receiving the set of reference signal samples from the mobile wireless network; (f) at the remote position, receiving the reference clock signal from the navigation system; (g) dividing the frequency of the reference clock signal, received at the remote position, to a lower frequency to form a slower clock signal; (h) at the remote position, transmitting the set of reference signal samples and the slower clock signal over a relatively short-range, radio communications path; (i) at a detection position, receiving from free space the leakage signal including the signal part using a leakage detector that does not include a receiver for a navigation system; (j) at the detection position, receiving the set of reference samples and the slower clock signal from the radio communications path; (k) at the detection position, generating a local clock signal from the slower clock signal, the local clock signal having a frequency substantially equal to the frequency of the reference clock signal and being substantially phase-locked to the reference clock signal; (l) at the detection position, sampling the leakage signal including the signal part in synchronism with the local clock signal, to form a set of leakage signal samples; (m) at the detection position, performing a coherent cross-correlation of the set of reference samples and the set of leakage samples, to produce a correlation peak characterized by a parameter; (n) at the detection position, determining a value related to the parameter of the correlation peak; and (o) at the detection position, displaying or otherwise indicating the value. The value generally becomes more optimized as the detection position of the leakage signal approaches the leak. The leak is found by iteratively changing the detection position relative to the leak while repeating the method until the value is substantially optimized.

BRIEF DESCRIPTION OF THE DRAWING

Further objects of the present invention will become apparent from the following description of the preferred embodiment with reference to the accompanying drawing, in which:

FIG. 12 is a schematic illustration of another embodiment of a system for finding a QAM signal leak in an HFC network, according to the present invention.

DETAILED DESCRIPTION OF THE PREFERRED EMBODIMENT

Figure 1:
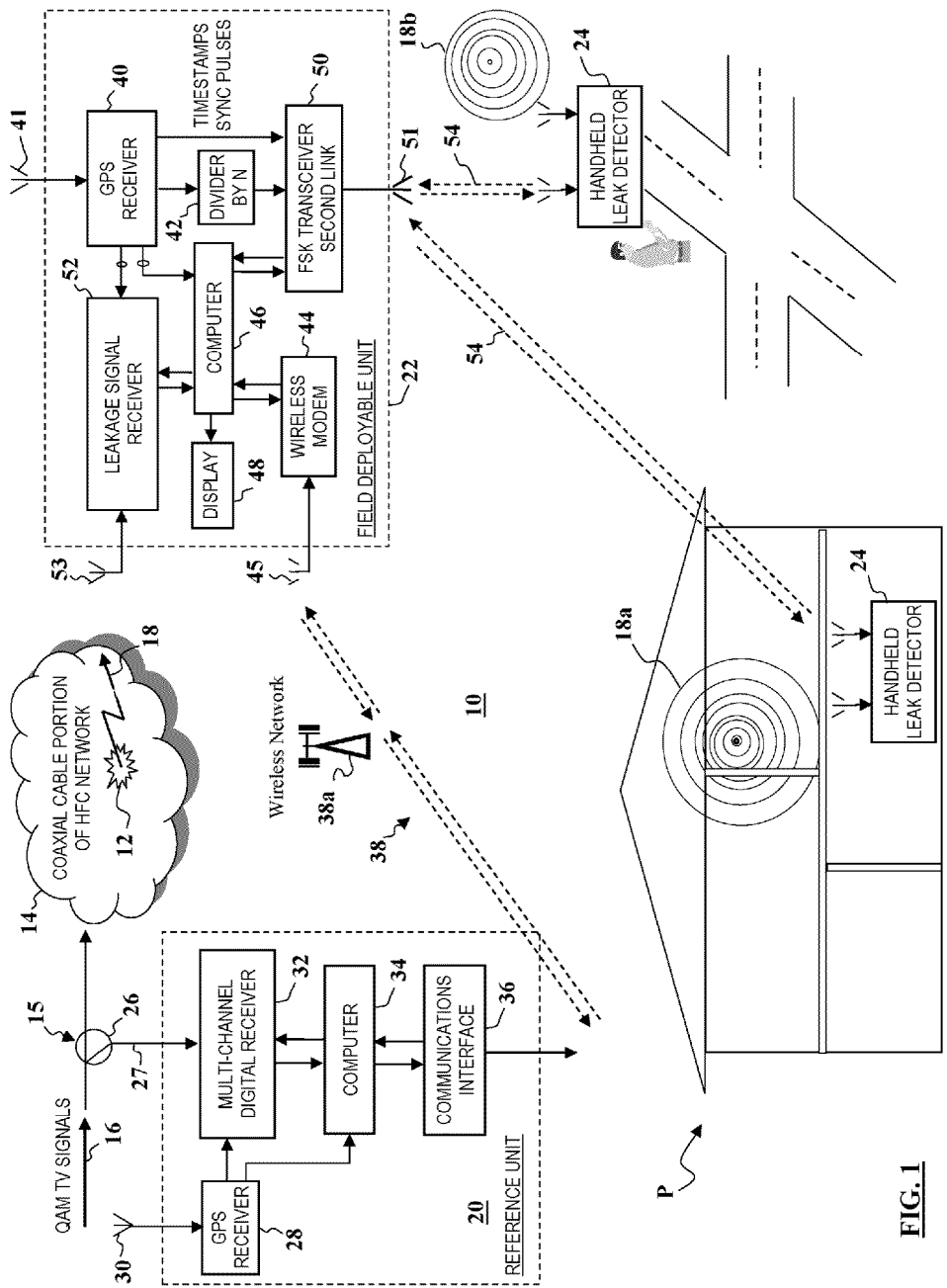
FIG. 1 is a block diagram and schematic illustration of one embodiment of a system for finding a digital signal leak in an HFC network, according to the present invention.

Referring to FIG. 1, there is shown a system 10 for finding a leak 12 in a coaxial cable portion 14 of an HFC network carrying a digital quadrature amplitude modulation (QAM) television signal 16 (e.g., a 256-QAM signal). Leak 12 emits QAM signal 16 into free space as a leakage signal 18. In this embodiment, system 10 is employed in a typical cable television (or CATV) network system supporting bi-directional communications. The cable television network has a forward path (e.g., 54-1000 MHz) and a return path (e.g., 5-42 MHz). Digital QAM television signals 16 are transmitted in the forward path typically from a headend to a number of subscribers, and the subscribers communicate with the headend generally in the return path. The design and construction of bi-directional cable television HFC networks are well-known and will not be further described.

In FIG. 1, system 10 comprises a reference unit 20, a field-deployable unit 22, and at least one handheld leakage detector 24. Reference unit 20 is adapted to be coupled to the HFC network at a reference point 15, by any suitable means, to receive QAM television signals 16. Examples of suitable coupling means include, but are not limited to, a simple jumper cable if a test port is provided in the network or a combination of a directional coupler inserted into the network and a jumper cable. Reference unit 20 could be coupled to the HFC network, for example, at the headend (where the QAM television signals originate), at a fiber node via an RF test point, at a trunk or bridge amplifier, at line extender or other network device, at a multi-tap, at the end of a drop cable, at a network interface device (NID), or a coaxial cable or cable port outside or inside a subscriber premises. The terms "HFC network" or "cable network" used in this specification includes (but, of course, is not limited to) the coaxial cabling downstream of a multi-tap, such as, e.g., the subscriber's drop cable, an ND, and coaxial cabling outside and inside the subscriber's premises.

Reference unit 20 includes a subsystem of components which are preferably, but not necessarily, housed in a single unit. Reference unit 20 includes a navigation receiver 28 and antenna 30, a multi-channel digital receiver 32, a programmable data processor or computer 34, and a communications interface 36. Navigation receiver 28 is preferably for a satellite-based navigation system, such as the GPS, but may be for a terrestrial-based system, such as LORAN. In this embodiment, navigation receiver 28 is a GPS receiver and antenna 30 is a GPS antenna. GPS receiver 28 receives from the GPS system sync pulses, timestamps, and a 10 MHz reference clock signal. Digital receiver 32 and computer 34 are coupled to GPS receiver 28 to receive the MHz reference clock signal. Computer 34 also receives the sync pulses and timestamps from GPS receiver 28.

Figure 2:
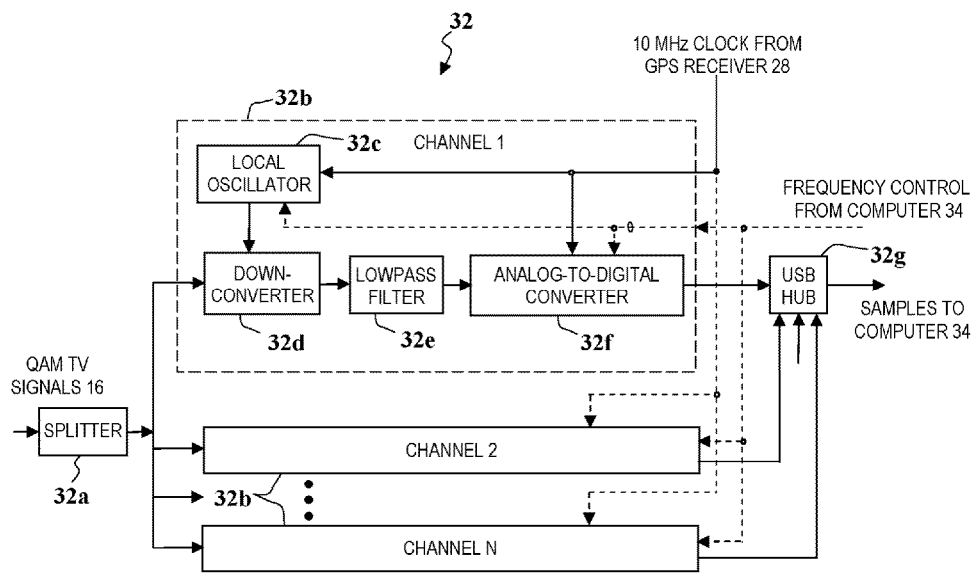
FIG. 2 is a block diagram of a multi-channel digital receiver used in a reference unit of the system shown in FIG. 1.

In this embodiment, digital receiver 32 has N number of channels and is frequency agile to allow up to N number of RF QAM television signals 16 to be selected and received from the HFC network simultaneously. Receiver 32 receives QAM television signals 16 at reference point 15, via a directional coupler 26 and a cable 27. Digital receiver 32 converts the RF versions of the selected QAM signals to zero IF versions and samples each of the zero IF versions to form a set of reference samples for each QAM signal 16. FIG. 2 illustrates a block diagram of digital receiver 32. As shown in FIG. 2, QAM television signals 16 pass through a splitter 32a to create multiple outputs, which are applied to the inputs of N channels 32b. Channels 32b are identical, but each is tuned to a different QAM television signal 16 (i.e., TV channels). Each channel 32b comprises an RF receiver and a digital sampler. The RF receiver includes a local oscillator (LO) 32c, an RF analog down-converter 32d, and a lowpass filter 32e. The digital sampler (in this embodiment) is an analog-to-digital converter (ADC) 32f. Each LO 32c is synchronized by the 10 MHz reference clock signal from GPS receiver 28. The frequency of each LO 32c and the operation of ADC 32f are controlled by signals from computer 34. Computer 34 controls ADC 32f in response to the sync pulses received from GPS receiver 28. A CW carrier from LO 32c is mixed with QAM television signals 16 in down-converter 32d. The selected QAM signal 16 is converted to zero IF in down-converter 32d by setting the carrier frequency of LO 32c to the center frequency of the selected QAM signal 16. The zero IF signal is then filtered by lowpass filter 32e. Filter 32e passes the zero IF signal and substantially removes any high frequency signals produced by down conversion. The filtered zero IF signal is then converted to digital form by ADC 32f. The sampling rate and synchronization of ADC 32f is established from the 10 MHz reference clock signal from GPS receiver 28. The preferred sampling rate is 10 MHz. The output of ADC 32f is a set of digital samples of the selected QAM signal 16 ("a set of reference samples"). A set of reference samples of each selected QAM signal 16 (from the N channels) is fed to a USB hub 32g and then transmitted to computer 34. The down-conversion process of digital receiver 32 is further described in U.S. Patent App. Pub. No. 2011/0043640 (see pars. [0080] to [0084] and FIGS. 4-6), incorporated herein by reference.

Figure 3:
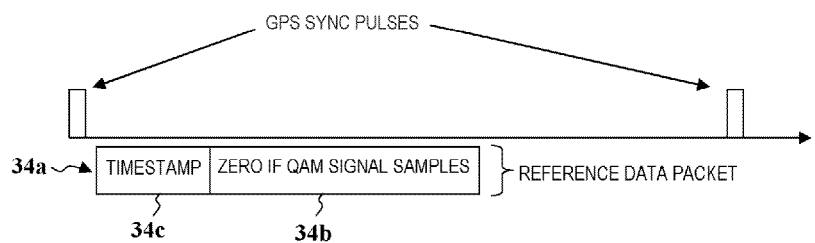
FIG. 3 is a diagram of a reference data packet aligned with a timing diagram of GPS sync pulses.

Again referring to FIG. 1, computer 34 is coupled to digital receiver 32 to receive the sets of reference samples of QAM signals 16 and to provide the control signals to receiver 32. Computer 34 is programmed to associate a timestamp (received from GPS receiver 28) with each of the sets of reference samples and assemble a data packet for each set of samples. As shown in FIG. 3, a data packet 34a contains a set of reference samples 34b and a GPS timestamp 34c, and is referred to herein as a "reference data packet." As shown in FIG. 1, communications interface 36 is coupled to computer 34 or is implemented in computer 34 as hardware and/or software. Interface 36 provides a means for delivering reference data packets 34a to a communications link 38. Link 38 includes a mobile wireless network 38a over part of or the entire link. Link 38 may include a wired portion and a wireless portion. It may also include the Internet. In one example, interface 36 may comprise a software browser and a Wi-Fi card in computer 34, if link 38 includes the Internet and a wireless connection to the Internet is desired. In another example, interface 36 may include a mobile wireless modem or other suitable device to communicate directly with mobile wireless network 38a.

Field-deployable unit 22 is typically mounted or carried in a service vehicle. It is connected to antenna mounted on the outside of the vehicle, for reception of signals from GPS satellites and HFC network leaks. Unit 22 includes a GPS receiver 40 connected to a GPS antenna 41, a frequency divider 42, a wireless modem 44 and antenna 45, a data processor or computer 46 with a display 48, a FSK transceiver 50 and antenna 51, and a leakage signal receiver 52 and associated antenna 53. In this embodiment, field-deployable unit 22 is equipped to perform a leakage detection function and a communications bridge or relay function. The leakage detector function involves leakage signal receiver 52, which is tuned to receive QAM leakage signal 18 or other leakage signals via leakage antenna 53. The leakage detection function is described in U.S. Patent App. Pub. No. 2011/0043640 (see pars. [0089] to [0098] and FIGS. 1, 7 & 8), incorporated herein by reference, and will not be further described here. The communications bridge function is an aspect of the present invention and will be described here. The latter function allows the leakage detection function to be extended on-foot over short ranges beyond the vehicle, such as along a street, up a utility pole, or around and inside a subscriber's premises.

In the embodiment of FIG. 1, the communications bridge function is performed by GPS receiver 40, frequency divider 42, wireless modem 44, computer 46, and FSK transceiver 50. GPS receiver 40 is identical to GPS receiver 28. Again, instead of a satellite-based navigation system, a terrestrial system may be employed, in which case receiver 40 may be a LORAN receiver. Receiver 40 receives sync pulses, timestamps and the 10 MHz reference clock signal from the GPS satellite system. Frequency divider 42 receives the 10 MHz reference clock signal from GPS receiver 40 and divides it down by a factor of N, to produce a lower frequency clock signal. The lower frequency clock signal is used as the data clock in FSK transceiver 50. Divider 42 may include a phase-lock loop between its input and output (or may be designed as a phase-lock loop) to ensure that the lower frequency clock signal is synchronized to the reference clock signal. The division factor N is preferably in the range of about 40 to about 320. In this embodiment, N is set to 320 to produce a data clock rate or frequency of 31.25 KHz. Wireless modem 44 is adapted to send and receive data over mobile wireless network 38a, using antenna 45. Modem 44 receives reference data packet or packets 34a from reference unit 20, via communications link 38. Each reference data packet 34a is passed from modem 44 to computer 46 and then from computer 46 to FSK transceiver 50.

Figure 4:
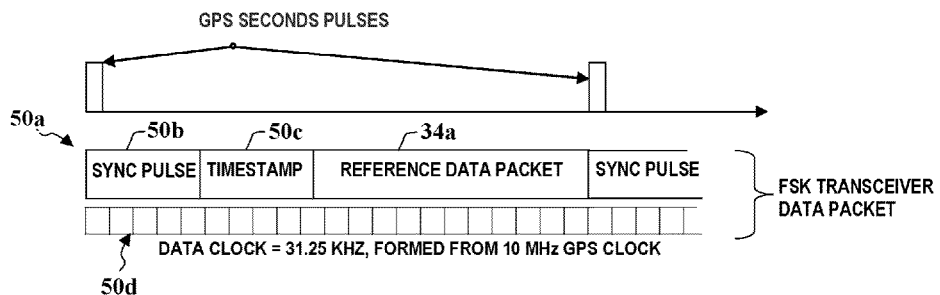
FIG. 4 is a diagram of an FSK transceiver data packet aligned with a timing diagram of GPS sync pulses.

FSK transceiver 50 is coupled to wireless modem 44 through computer 46 and is also coupled to divider 42 and GPS receiver 40. Transceiver 50 receives the lower frequency clock signal from divider 42 for use as its data clock and receives sync pulses and timestamps from GPS receiver 40. Thus, transceiver 50 handles a data packet that includes the lower frequency clock signal, reference data packet 34a, and the GPS sync pulses and timestamps (collectively, "FSK transceiver data packet"). A representation of the FSK transceiver data packet is shown in FIG. 4. In FIG. 4, an FSK transceiver data packet 50a comprises reference data packet 34a, a GPS sync pulse 50b, a GPS timestamp 50c, and a lower frequency clock signal (or data clock) 50d. FIG. 4 also includes a timing diagram showing that data packet 50a has a duration of about one second or the period of the GPS sync pulses. It may be desirable to generate two or more FSK transceiver data packets within one second or the period of the GPS sync pulses, for better responsiveness in leak detection. This would require a corresponding number of reference data packets per second (or period) from reference unit 20 and the generation of additional sync pulses (within the one-second period). Such additional sync pulses are synthesized from the original GPS sync pulses and the reference clock signal (in both reference unit 20 and field-deployable unit 22).

Again referring to FIG. 1, FSK transceiver 50 functions primarily as a radio transmitter, in a master mode of operation. It operates in an ISM band of frequencies, e.g., from the group of bands consisting of 902 MHz to 928 MHz, 862 MHz to 870 MHz, and 431 MHz to 464 MHz. These frequency bands are examples and are not intended to be limiting of the operating bands for the present invention. Transceiver 50 transmits transceiver data packet 50a over a relatively short-range, radio communications path 54, between transceiver 50 and handheld leakage detector 24. The term "radio" means the use of modulated electromagnetic waves propagating in free space to transmit or receive information in the form of electric signals. A "radio communications path" is a free space communications path, without wires, between the points of transmission (e.g., transceiver 50) and reception (e.g., transceiver 60—FIG. 5). The term "relatively short-range" means a distance no greater than about 450 meters. In this embodiment, radio communications path 54 is generally no greater than about 450 meters and typically no greater than about 100 meters. It is more typically between about 30 and 100 meters. A 450 meter communications path may be useful for searches of leaks in a multiple dwelling unit, such as an apartment building. These short ranges adequately extend the leakage detection capability of field-deployable unit 22 beyond the service vehicle, which is an object of the present invention. FIG. 1 shows two examples of radio communications path 54—one that extends into a subscriber's premises P and another that runs along a street proximate to the HFC network or subscriber's premises.

Handheld leakage detector 24 is shown in FIG. 1 deployed inside subscriber premises P and also outside along a street near the HFC network. FIG. 1 shows leakage detector 24 detecting a QAM leakage signal 18a (from coaxial cable portion 14) inside premises P and a QAM leakage signal 18b (from coaxial cable portion 14) outside along the street. An object of the present invention is to provide a low-cost leakage detector of the type that performs coherent cross-correlation detection of digital signal leakage. Leakage detector 24 achieves this object, at least in part, because: (1) it does not require and does not include a GPS receiver or other (satellite or terrestrial) navigation system receiver; (2) preferably, it does not include a mobile wireless modem with accompanying paid data plan; and (3) it communications via a free ISM band.

Figure 5:
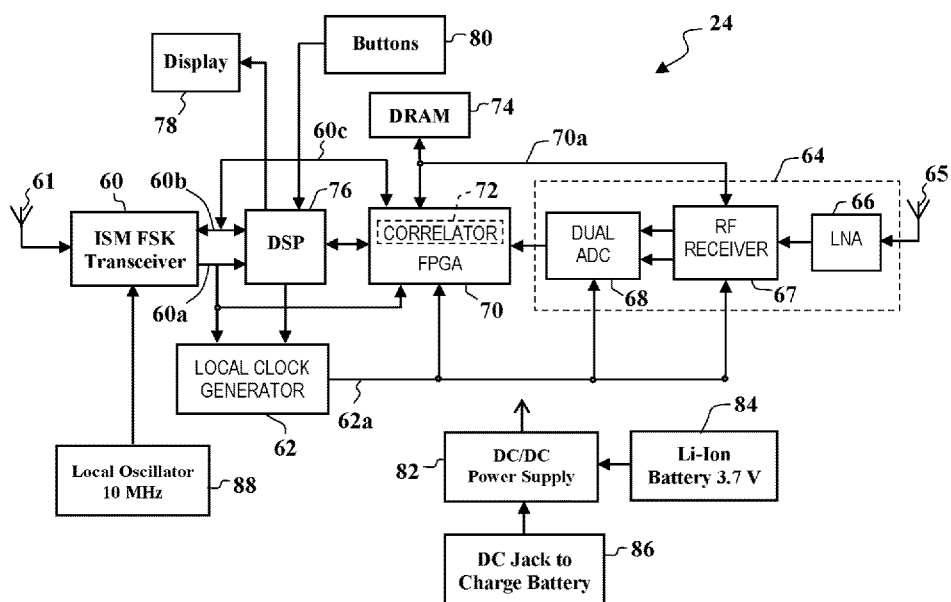
FIG. 5 is a block diagram of a low-cost handheld leakage detector, which is part of the system shown in FIG. 1.

FIG. 5 shows a block diagram of handheld leakage detector 24. Detector 24 includes: an FSK transceiver 60 and antenna 61; a local clock generator 62; a digital receiver 64 with an antenna 65, a low noise amplifier (LNA) 66, a tunable RF receiver 67, and a dual analog-to-digital converter (ADC) 68; a field programmable gate array (FPGA) 70 implementing a multi-channel correlator 72; dynamic random access memory (DRAM) 74; a digital signal processor (DSP) 76 functioning as a general controller; a display 78; and a set of buttons 80 to select modes of operation. Detector 24 further includes a DC to DC power supply 82, lithium-ion battery 84, a DC jack 86 to charge battery 84, and a 10 MHz local oscillator 88 used in a master mode of operation. FPGA 70 is programmed to function, among other ways, as a data processor and a data controller. FSK transceiver 60 (and transceiver 50) may be an ADF7025 by Analog Devices, Inc., Norwood, Mass.; local clock generator 62 may be a PLL clock DDS AD9832 by Analog Devices, Inc.; LNA 66 may be an MGA 62563 by Avago Technologies, Inc., San Jose, Calif.; dual ADC 68 may be an AD9251 by Analog Devices, Inc.; FPGA 70 may be a Spartan-3 FPGA Family XC3S1000-5FGG, by Xilinx, Inc., San Jose, Calif.; DRAM 74 may be an SDRAM MT48LC16M16A2TG-75 by Micron Technology, Inc., Boise, Id.; DSP 76 may be a TMS320F2812 by Texas Instruments, Incorporated, Dallas, Tex.; and DC to DC power supply 82 may be a LM5008 by National Semiconductor/Texas Instruments, Incorporated.

Again referring to FIG. 5, transceiver 60 functions primarily as a radio receiver in a normal or slave mode of operation. Transceiver 60 operates in the same ISM band of frequencies as transceiver 50. Transceiver 60 is tuned to receive FSK transceiver data packet 50a from transceiver 50 via radio communications path 54. Transceiver 60 includes a data clock output 60a and a data/control output 60b. Local clock generator 62 is coupled to data clock output 60a to receive the lower frequency clock signal from transceiver 60. Clock generator 62 converts (or multiplies) the lower frequency clock signal to a local clock signal having a frequency that is the same as the frequency of the GPS reference clock signal (e.g., 10 MHz). Clock generator 62 contains a phase-lock loop between its input and output (or may be designed as a phase-lock loop) to ensure that the local clock signal is synchronized to the lower frequency clock signal and thus, in turn, to the 10 MHz GPS reference clock signal. In this example, the local clock signal has a frequency of 10 MHz. As shown in FIG. 5, the local clock signal is applied to RF receiver 67, dual ADC 68, and FPGA 70, via an output line 62a, to synchronize their operations.

Figure 6:
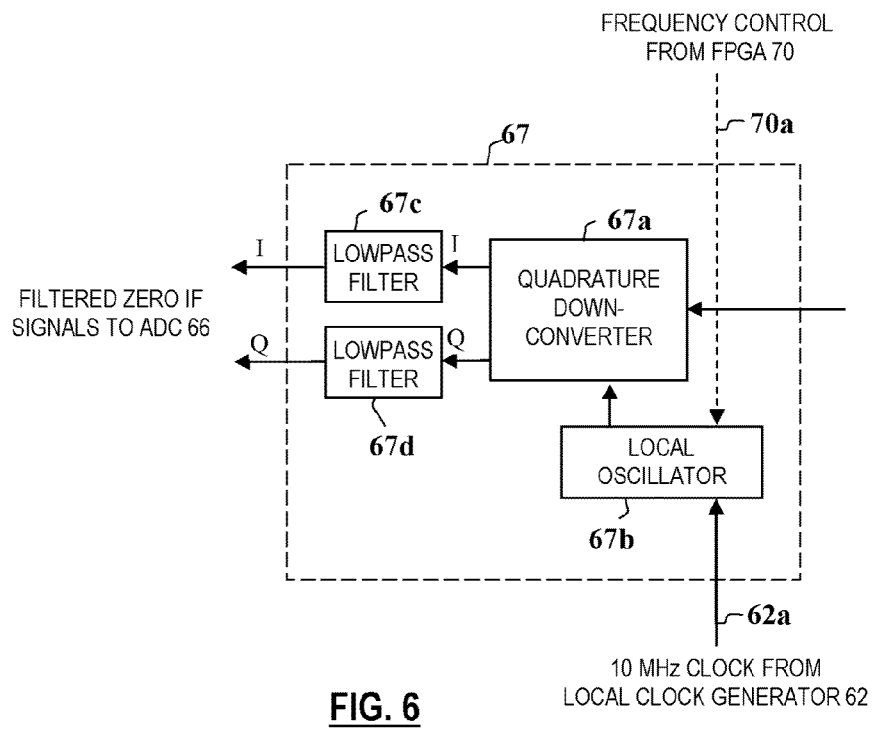
FIG. 6 is a block diagram of an RF receiver, comprising a quadrature down-converter, local oscillator, and lowpass filters, used in the leakage detector of FIG. 5.

Digital receiver 64 is adapted to receive leakage signal 18 (or leakage signals 18a, 18b) from free space via antenna 65. The received RF leakage signal is amplified in LNA 66, down-converted to zero IF in RF receiver 67, and sampled in dual ADC 68 to create digital samples. As shown in FIG. 6, RF receiver 67 preferably includes a quadrature down-converter 67a having in-phase and quadrature (I and Q) channels and outputs, a local oscillator (LO) 67b generating a carrier, and I and Q lowpass filters 67c and 67d. A quadrature down-converter is used because the phase of leakage signal 18 is unknown. Down-converter 67a may be a Max3580 by Maxim Integrated Products, Sunnyvale, Calif. Down-converter 67a converts I and Q components of QAM leakage signal 18 from RF to zero IF (baseband) by tuning the carrier of LO 67b to the same center frequency as the leakage signal. LO 67b is tuned by a control or voltage signal sent from FPGA 70 via a control line 70a (FIG. 6). The carrier of LO 67b is synchronized with the 10 MHz local clock signal received from clock generator 62. As a result, the carrier of LO 67b is coherent with the carrier of LO 32c in digital receiver 32 of reference unit 20. The I, Q outputs of down-converter 67a contain the in-phase and quadrature components of the zero IF version of QAM leakage signal 18. These zero IF I, Q components are filtered in lowpass filers 67c, 67d, respectively, to substantially remove any high frequency mixing products generated by the down-conversion. The filtered I, Q components are then received by dual ADC 68 (FIG. 5), where each component is individually sampled at a 10 MHz rate to produce I and Q sets of leakage samples. The sampling rate of ADC 68 is established by the synchronized local clock signal from generator 62. Thus, the I and Q sets of leakage samples are formed in synchronism with the local clock signal. The leakage samples are then sent from ADC 68 to FPGA 70. The operation of digital receiver 64 can be further understood, if necessary, from U.S. Patent App. Pub. No. 2011/0043640 (see pars. [0089] to [0098] and FIG. 7), incorporated herein by reference.

As shown in FIG. 5, data/control line 60b and data clock line 60a of transceiver 60 are coupled to DSP 76, and data/control line 60b is coupled to FPGA 70 via a data line 60c. DSP 76 is configured as a general controller for controlling transceiver 60, display 78, buttons 80, and battery 84. DSP also receives data from FPGA 70 and sends it to display 78 for display. DSP 76 also controls the setup frequency, data rate and output level of transceiver 60 when transceiver 60 operates in the master mode (hereinafter described). Reference data packet 34a, sync pulse 50b and timestamp 50c of FSK transceiver data packet 50a are routed from transceiver 60 to FPGA 70 via data/control line 60b and data line 60c. FPGA 70 is programmed to start recording I and Q sets of leakage samples from ADC 68 upon receiving (or at some point after receiving) the leading edge of sync pulse 50b. Once the I and Q sets of leakage samples are recorded, FPGA 70 associates timestamp 50c with both sets of samples. The I and Q sets of leakage samples and associated timestamp 50c are stored in DRAM 74. A specific delay may be introduced by FPGA 70 after receiving the leading edge of sync pulse 50b, so that the recording of I and Q leakage samples can be delayed. Such a delay may be employed to compensate for or alter the actual delay between the time when the reference samples are created and when the leakage samples are created.

When FPGA 70 receives a particular reference data packet 34a from transceiver 60, timestamp 34c (FIG. 3) from that data packet is read. FPGA 70 then searches in DRAM 74 for I and Q sets of leakage samples associated with a timestamp that is the same as timestamp 34c. If such I and Q sets of samples are found, FPGA 70 retrieves them. That is, if timestamp 34c of currently received reference data packet 34a is the same as timestamp 50c of a previously stored data file of I and Q sets of leakage samples, then such previously stored I and Q sets of leakage samples are retrieved. FPGA 70 is programmed to deliver to correlator 72 reference samples 34b (FIG. 3) of the currently received reference data packet 34a and the previously stored leakage samples associated with timestamp 50c, if the condition is met that timestamp 34c is the same as timestamp 50c.

Correlator 72 is implemented in FPGA 70 as a cross-correlation processor, which carries out the cross-correlation algorithm in real time for many (e.g., 2000) channels simultaneously in synchronism with the 10 MHz local clock signal. Correlator 72 is implemented with in-phase and quadrature (I and Q) correlation channels. Reference samples 34b are cross-correlated with each I and Q sets of leakage samples, to produce I and Q quadrature components of a cross-correlation function F. Cross-correlation function F is calculated from an expression which is the square root of the sum of the squares of the I and Q quadrature components (or $F=\sqrt{(I^2+Q^2)}$). Correlator 72 performs a coherent cross-correlation of the set of reference samples and the I and Q sets of leakage samples. The cross-correlation is coherent because reference samples 34b are produced in synchronism with the GPS reference clock signal and the I and Q sets of leakage samples are produced in synchronism with the local clock signal, which is synchronized or phase-locked to the GPS reference clock signal. Correlator 72 is implemented and operated in the same manner as described in U.S. Patent App. Pub. No. 2011/0043640 (see pars. [0094] to [0097] and FIG. 8), incorporated herein by reference. Alternatively, the cross-correlation calculation can be performed in the frequency domain by a multiplication operation (as is well-known in the art), where the time delay (of the QAM leakage signal) is directly obtained from the result. In the latter case, the frequency domain result can be converted to the time domain by an Inverse Fast Fourier Transformation to construct a cross-correlation function. The term "cross-correlation" is intended herein to encompass (without limitation) both the time domain and frequency domain approaches discussed above.

Figure 7:
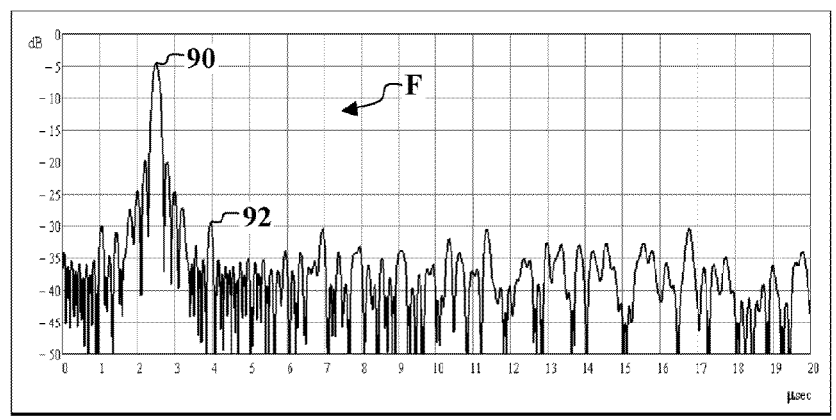
FIG. 7 is a plot of a cross-correlation function resulting from a cross-correlation of samples of a QAM television signal and samples of a related QAM leakage signal.

An example of cross-correlation function F is shown in FIG. 7. Function F is plotted on a graph with a y-axis representing field strength or level of leakage signal 18 (as detected in detector 24), in units of dBmV/m, and an x-axis representing time delay (in units of microseconds (μs)) of detected leakage signal 18 relative to the time when QAM signal 16 is sampled. In FIG. 7, cross-correlation function F has a major correlation peak 90 and a secondary peak 92. Peak 90 represents the strongest and closest leak relative to the position of detector 24. The distance of detector 24 to the strongest leak is proportional to the time delay shift of peak 90, or about 2.5 μs. Peak 92 represents a weaker and more distant leak relative to detector 24. The distance of detector 24 to the weaker leak is proportional to the time delay shift of peak 92, or about 4 μs.

Figure 8:
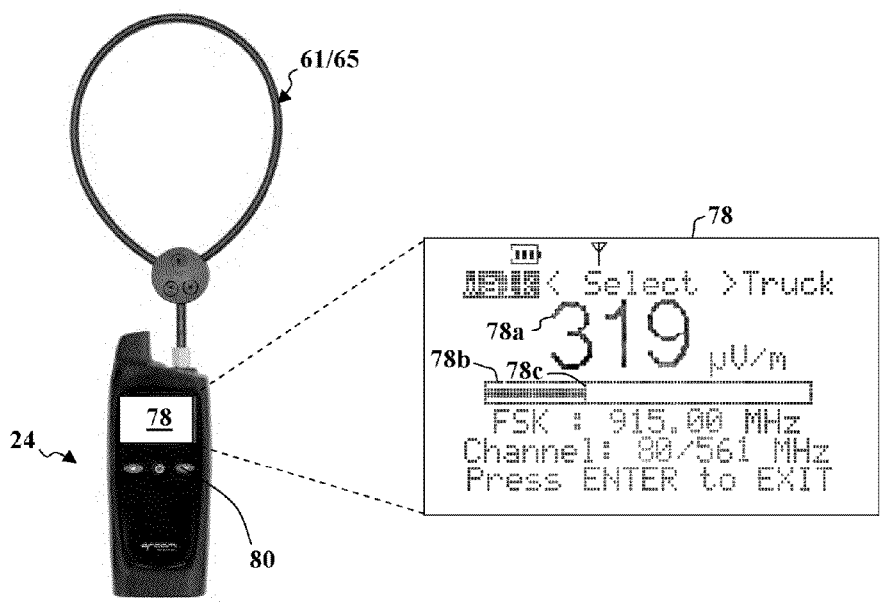
FIG. 8 is a depiction of one form of the handheld leakage detector of the system shown in FIG. 1, focusing on a display of the detector and the display of values derived from a cross-correlation function.

Once cross-correlation function F is produced, FPGA 70 is programmed to detect its peaks and measure peak levels and time delays. Cross-correlation function F may be characterized, at least in part, by the parameters: correlation peak level; and peak time delay. FPGA 70 is programmed to determine certain values related to the peak level and time delay parameters and then indicate the values in some fashion (e.g., display them as a number or graph on display 78). Correlation peak level may be used to express an actual or relative field strength value of leakage signal 18 or an actual or relative distance value to the leak (from detector 24). The field strength and distance values can be displayed as numbers or in the form of an indicator bar with a peak hold feature. The time delay parameter may be used to express an actual or relative distance value to the leak, displayed as a number or indicator bar with a peak hold feature. FIG. 8 illustrates one form of handheld leakage detector 24 with display 78 and buttons 80 on a front side and a combined radio and leakage signal loop antenna 61/65. In FIG. 8, display 78 displays a field strength value 78a and an indicator bar 78b with a peak hold indication 78c. Value 78a may represent the actual field strength of leakage signal 18, as detected by detector 24. Indicator bar 78b indicates relative changes in field strength, as the bar advances and retreats while the operator moves toward or away from, respectively, the leak. Peak hold indication 78c marks the highest level reach for the field strength. Alternatively, number 78a could indicate a distance to the leak, indicator bar 78b could indicate relative changes in the distance, and peak hold indication 78c could mark the shortest distance reached to the leak.

The value being displayed on display 78 (e.g., field strength or distance) generally becomes more optimized as the detection position (in this case, the position of leakage detector 24) approaches the leak. "Optimized" means maximized for actual or relative field strength and means minimized for actual or relative distance. A leak is found by iteratively changing the detection position of leakage detector 24 relative to the leak, while operating system 10, until the selected value is substantially optimized.

Figure 9:
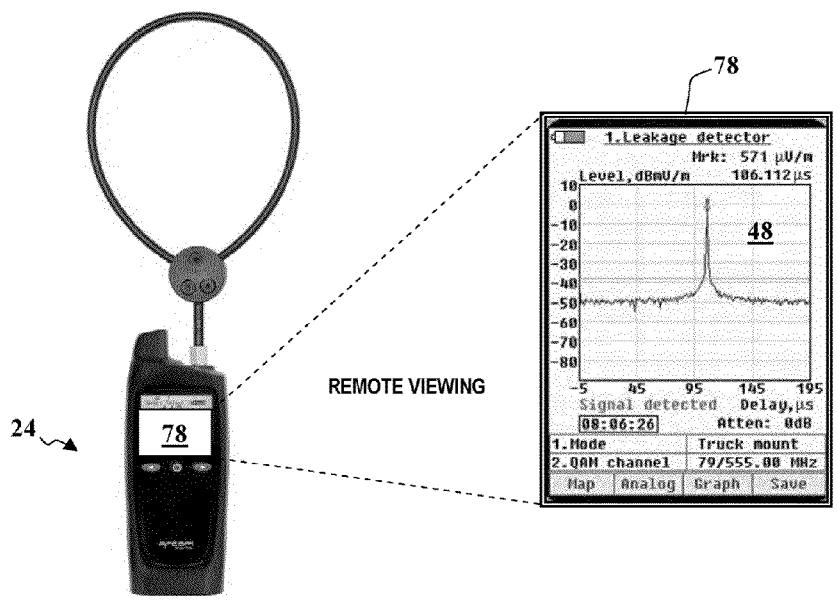
FIG. 9 is another depiction of the form of the handheld leakage detector, focusing on the display of the detector and the remote display of content from a field-deployable unit of the system in FIG. 1.

Referring to FIG. 9, a remote viewing mode of operation for leakage detector 24 is illustrated. Display 78 is shown displaying the content of display 48 of field-deployable unit 22. The content of display 48 is a real-time or substantially real-time plot of a correlation function, where the y-axis is correlation peak level and the x-axis is correlation peak time delay shift (FIG. 9). This plot represents the detection of leakage signal 18 by field-deployable unit 22, using its own leakage detector, i.e., leakage signal receiver 52. (See FIG. 1). The content of display 48 is data and may be packaged in the FSK transceiver data packet and normally transmitted by transceiver 50 to detector 24. Alternatively, the display data may be sent as a separate data packet when requested by detector 24. In the latter case, a request for such data is automatically sent by detector 24 when it is switched to the remote viewing mode. Thus, detector 24 functions as a remote display device for field unit 22. Usually, unit 22 is mounted in a service vehicle. Leakage signal 18 will usually be detected first by unit 22 (using receiver 52), while the service vehicle is on a street along the HFC network. When leakage signal 18 is detected, display 48 will display the detection as a correlation function, as in FIG. 9. Detector 24 may then be carried on foot along the street or into a subscriber premises to further pinpoint the location of the leak. Once the leak is found and repaired, the repair person can switch detector 24 to the remote viewing mode to see what is being displayed in the service vehicle. This allows the repair person to confirm whether or not he or she has repaired the same leak originally detected and displayed in the service vehicle (i.e., whether the original problem been solved).

Figure 10:
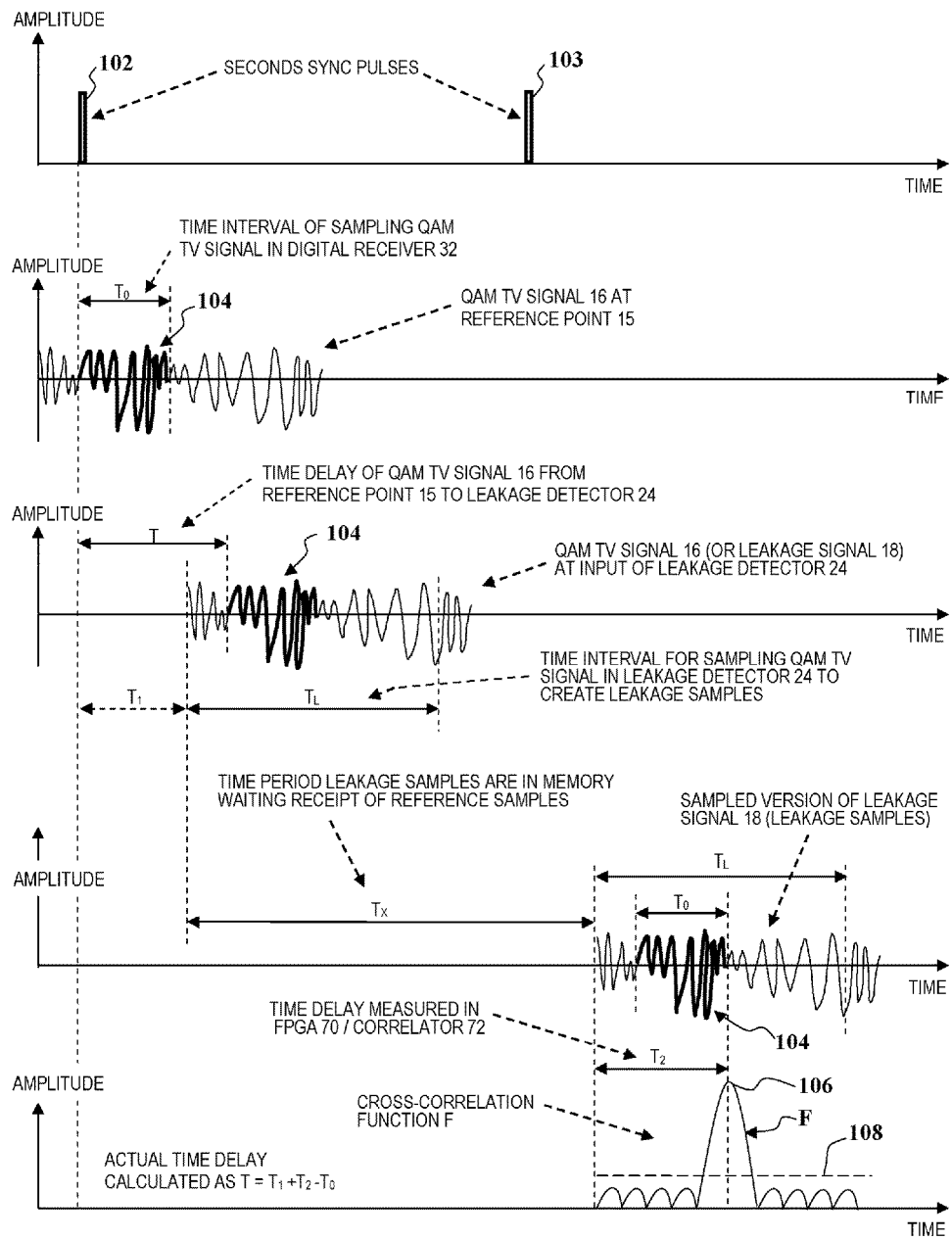
FIG. 10 is a series of amplitude versus time plots, illustrating the timing of a QAM television signal at the reference unit and at the handheld leakage detector of the system shown in FIG. 1.

Referring to FIG. 10, a series of amplitude versus time plots are presented. The first plot (from the top) shows two GPS sync pulses 102 and 103, separated by a one second time period. The next plot shows a representation of QAM television signal 16 (in the time domain) as tapped by reference unit 20 at reference point 15. Signal 16 is sampled in digital receiver 32 (FIG. 1) and recorded in computer 34 over a reference time interval $T_0$ (FIG. 10). Interval $T_0$ starts from the leading edge of sync pulse 102. The sampled portion of signal 16 is indicated as a signal part 104 (bolded), which spans interval $T_0$. The duration of interval $T_0$ affects, proportionally, the size of the set of reference samples of signal part 104 and the sensitivity of detector 24. The third plot in FIG. 10 shows QAM television signal 16 shifted by a time interval T, which represents the total propagation time of signal 16 from reference point 15 to leak 12 (via the HFC network) and from leak 12 to detector 24 (via free space). Once signal 16 is emitted from leak 12, it is referred to as leakage signal 18. As indicated in the third plot, leakage signal 18 also contains signal part 104.

The sampling interval of leakage signal 18 in detector 24 is also started relative to the leading edge of sync pulse 102, but sampling is delayed by a time delay $T_1$. Time delay $T_1$ is preferably employed because signal 18 (carrying signal part 104) is not expected to arrive at detector 24 immediately after sync pulse 102. In addition, the delay reduces the number of samples required of signal 18 to capture and sample signal part 104. Thus, the time interval ($T_L$) over which leakage samples are recorded is reduced by employing delay $T_1$ (FIG. 10, third plot). If reference point 15 is at the headend, or upstream of the fiber optic portion of the HFC network, it is preferred that time delay $T_1$ be set to the estimated or measured signal propagation time from the headend (or reference point 15) to the fiber optic node in the HFC network. This is a good value for $T_1$ because RF leaks do not occur in the fiber optic portion of the HFC network. In other embodiments, $T_1$ may be set to zero or any arbitrary value less than the expected total propagation time T. The desired aim is to ensure that the sampling of signal part 104 in detector 24 is not missed because too much delay was introduced (i.e., the value of $T_1$ was set too large). The use of time delay $T_1$ also reduces the number of cross-correlation channels in correlator 72, because the number of channels is dependent on the total time period that must be covered by the cross-correlation. If a suitable $T_1$ is used, a reasonable number of channels for correlator 72 may be set at about 500 (50 microseconds×10 MHz). Preferably, about 2000 channels should be used to cover a range of HFC network architectures and time delay parameters. A correlator with 2000 channels corresponds to 200 microseconds of time delay. 2000 channels can be realized on a relatively small FPGA without great difficulty.

As shown in the third plot of FIG. 10, a time interval $T_L$ is the period over which leakage samples are recorded in detector 24, and is sometimes referred to herein as the "leakage time interval." As shown, leakage time interval $T_L$ is of sufficient duration to receive and sample signal part 104. This condition is likely to be met if $T_L$ has a duration of at least the reference time interval $T_0$ plus the maximum expected value for total propagation time T ("minimum duration"). Interval $T_L$ is preferably set greater than the minimum duration to ensure that signal part 104 is captured and sampled.

The fourth plot in FIG. 10 represents the sampled version of leakage signal 18, including signal part 104 (i.e., the I and Q sets of leakage samples). The sampled version is stored in DRAM 74 with an associated timestamp during a time interval $T_X$, until a reference data packet having the same timestamp is received by detector 24. Note from FIG. 10 that interval $T_X$ extends past GPS sync pulse 103, which illustrates that the reference data packet having the same timestamp as the stored leakage samples may (and most likely will) arrive in the next or a subsequent GPS interval. The fifth plot of FIG. 10 represents the cross-correlation function F calculated by correlator 72 from the samples of signal part 104 of signal 16 (second plot) and the I and Q leakage samples (either one represented in the fourth plot). A peak 106 of function F is formed when the signal parts 104 of the two groups of samples are matched up or correlated. Leakage signal 18 is detected by detecting peak 106, which must exceed a predetermined threshold 108. Threshold 108 is selected depending upon the sensitivity of digital receiver 64 and the lowest signal-to-noise ratio which does not produce significant false alarms (i.e., false leakage detections). Function F may contain a number peaks above threshold 108, from which a corresponding number of leakage signals may be detected. The amplitude of peak 106 is proportional to the strength of leakage signal 18. A time shift (or time delay) $T_2$ of peak 106 is proportional to the total propagation time T. If desired, the total propagation time T can be calculated using the equation, $T=T_1+T_2-T_0$. A further explanation of the time intervals and delays $T_0$, $T_1$, $T_L$ and $T_x$ is contained in U.S. Patent App. Pub. No. 2011/0043640 (see pars. [0052] to [0079] and FIG. 2), incorporated herein by reference.

Figure 11A:
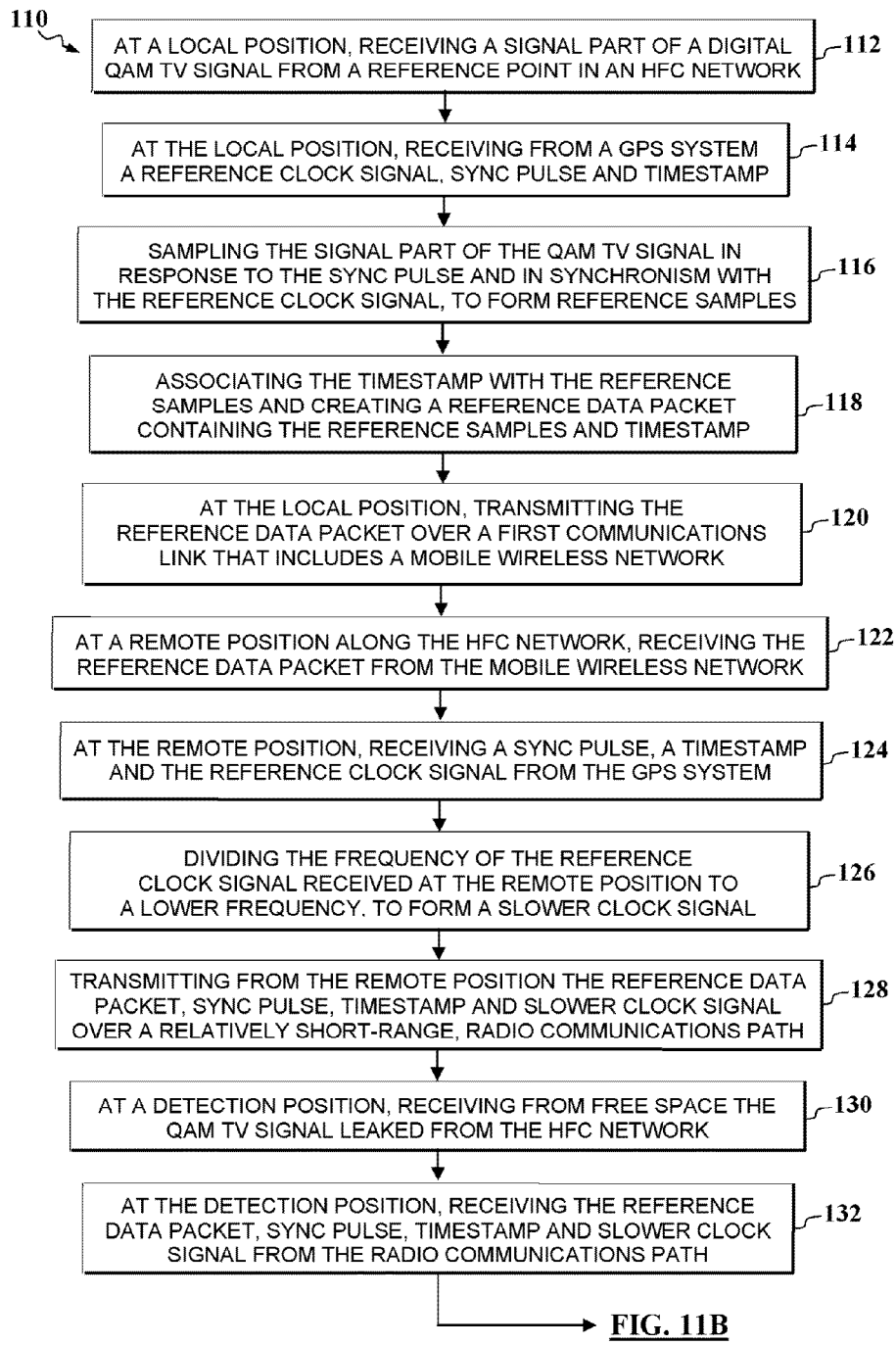
FIGS. 11A and 11B are flow diagrams illustrating a method of finding a digital signal leak in accordance with one embodiment of the present invention.
Figure 11B:
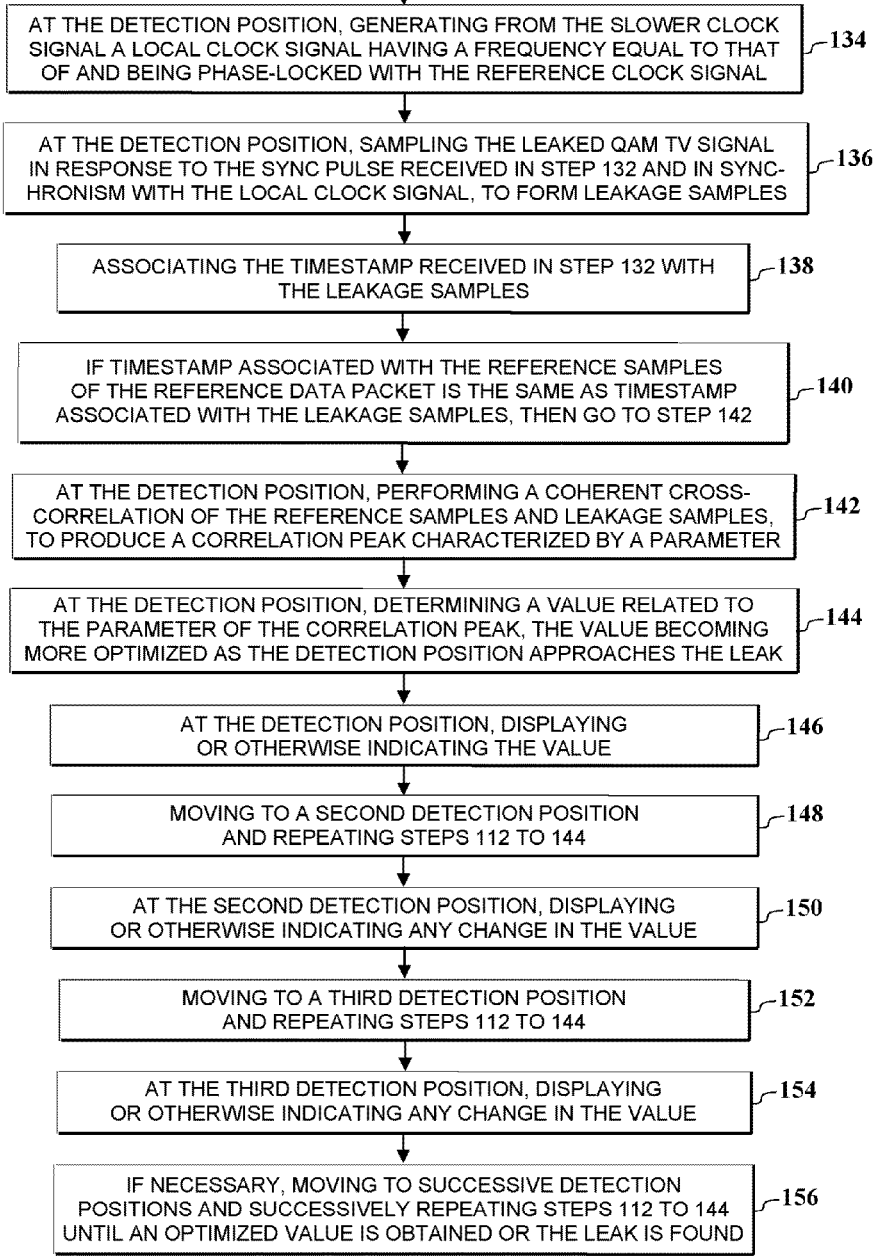

Referring now to FIGS. 11A and 11B, an exemplary method 110 of searching for a QAM television signal leak is outlined. In a first step 112, at a local position, a signal part (e.g., 104) of the QAM television signal (e.g., 16) is received from a reference point in an HFC network (e.g., reference point 15). In a next step 114, a reference clock signal, a sync pulse, and a timestamp associated with the sync pulse, are received at the local position from a GPS system. In another step 116, the signal part of the QAM television signal is sampled in response to the sync pulse and in synchronism with the reference clock signal, to form a set of reference samples. In a further step 118, the timestamp is associated with the set of reference samples and a reference data packet containing the set of reference samples and timestamp is created. In a step 120, the reference data packet is transmitted from the local position over a first communications link that includes a mobile wireless network. In a step 122, the reference data packet is received from the mobile wireless network at a remote position along the HFC network. In a step 124, a sync pulse, a timestamp, and the reference clock signal are received at the remote position from the GPS system. In a step 126, the frequency of the reference clock signal received at the remote position is divided to a lower frequency, to form a slower clock signal. In a step 128, the reference data packet and the sync pulse, timestamp and slower clock signal are transmitted from the remote position over a relatively short-range, radio communications path. In a step 130, the QAM television signal leaked from the HFC network is received at a detection position from free space. In a step 132, the reference data packet, sync pulse, timestamp, and slower clock signal are received at the detection position from the short-range radio communications path.

Referring to FIG. 11B, a step 134 involves generating, at the detection position and from the lower clock signal, a local clock signal having a frequency equal to that of and being phase-locked with the reference clock signal. In a step 136, the leaked QAM television signal is sampled at the detection position, in response to the sync pulse received in step 132 and in synchronism with the local clock signal, to form leakage samples. Again, the leakage samples are preferably I and Q sets of leakage samples from an in-phase and quadrature down-converter and sampler. In a step 138, the timestamp received in step 132 is associated with the leakage samples. In a step 140, if a condition is met that the timestamp associated with the reference samples of the reference data packet is the same as the timestamp associated with the leakage samples, then the method continues to a next step 142. In step 142, a coherent cross-correlation of the reference samples and leakage samples is performed at the detection position, to produce a correlation peak characterized by a parameter. In a step 144, a value related to the parameter of the correlation peak is determined at the detection position. The value is one that becomes more optimized as the detection position approaches the leak. In a step 146, the value is displayed or otherwise indicated at the detection position.

Again referring to FIG. 11B, a step 148 includes moving to a second detection position and repeating steps 112 to 144. In a step 150, any change in the value moving from the first detection position and the second detection position is displayed or otherwise indicated. A step 152 includes moving to a third detection position and repeating steps 112 to 144. In a step 154, any change in the value moving from the second detection position to the third detection position is displayed or otherwise indicated. As represented by a step 156, if necessary, steps 112 to 144 are successively repeated at successive detection positions until an optimized value is obtained or the leak is found. Thus, the method of searching for a QAM signal leak is performed by iteratively changing the detection position relative to the leak while repeating steps 112 to 144 until the value is optimized or the leak is found. The value or relative change in value indicates whether or not the leak is being approached. A feature such as, for example, a peak hold bar can indicate whether the value has become or is becoming optimized, either indication of which may prompt discovery of the leak.

Referring to FIG. 12, there is shown another application for leakage detector 24. In this application, two leakage detectors are used, and a reference unit and a field-deployable unit 22 are not used. In addition, a terrestrial or satellite navigation system is not used. Leakage detector 24 has the capability of functioning as a reference unit (like reference unit 20) and as a leakage detector (as heretofore described). FIG. 12 shows a leakage detector 24' functioning as a reference unit in a "master mode" and a leakage detector 24" functioning as a leakage detector in a "slave mode." This application is intended primarily for leak testing and location inside a subscriber's premises, where a service vehicle (containing a field-deployable unit) is not available or economically feasible. Typically, this application is carried out by an installer or repair person, who does not ride out in a service vehicle. In the following description, reference should be made to both FIGS. 5 and 12. Detectors 24' and 24" are configured alike and as shown in FIG. 5.

In FIG. 12, detector 24' includes an ISM antenna 61' (like antenna 61 in FIG. 5) connected internally to an ISM FSK transceiver (like transceiver 60 in FIG. 5). Hereafter, the internal elements of detectors 24' and 24" will be referred to and designated using the reference numbers in FIG. 5. In the master mode, FSK transceiver 60 of detector 24' is initialized to transmit data, such as reference data packets, sync pulses, timestamps, and a data clock signal to detector 24". DSP 76 of detector 24' controls the setup frequency, data rate and output level of transceiver 60, in the master mode. In this application, antenna 65 (FIG. 5) of detector 24' is replaced with a jumper cable 65', so QAM television signal 16 can be received from a coaxial connector port (or reference point) 15' in a subscriber premises P'. Alternatively, antenna 65 of detector 24' may remain in place and be used to receive signal 16 over-the-air from an un-terminated connector port. QAM signal 16 is selected and sampled in digital receiver 64 of detector 24', using one of the I and Q channels (e.g., the in-phase channel). In the master mode, local oscillator (LO) 88 becomes active and provides a suitably stable 10 MHz carrier signal to FSK transceiver 60. The LO carrier is divided down in frequency to an FSK data clock rate (e.g., 31.25 KHz) in a phase-locked divider circuit in the FSK transceiver chip (or in a separate circuit). This frequency divided signal serves as the data clock for FSK transceiver 60 in detector 24'. Local clock generator 62 reconstructs a 10 MHz phase-locked signal by multiplying the data clock signal from transceiver 60, in the same manner as described for original detector 24 in connection with FIG. 5. This reconstructed 10 MHz signal is phase-locked to the original carrier of LO 88 and is used as the local clock signal. The local clock signal is supplied via line 62a, as originally described for detector 24 in FIG. 5. Alternatively, LO 88 could be connected to line 62a through a switch, which connects LO 88 to and disconnects clock generator 62 from line 62a in the master mode. In either case, a 10 MHz signal is used as a clock signal to generate the set of reference samples from QAM signal 16. In the master mode, the in-phase channel of RF receiver 67 and AD converter 68 are used to down-convert and sample QAM signal 16.

In the master mode, FPGA 70 is programmed to synthesize sync pulses and timestamps from the 10 MHz local clock signal. This is done by dividing the frequency of the local clock signal down to a one-second period, as may be done in an electronic watch. The synthesized sync pulses are used (among other uses) in FGPA 70 to trigger sampling of QAM television signal 16 in receiver 64 of master detector 24'. FPGA 70 is also programmed to assemble a reference data packet (like data packet 34a), including the reference samples of signal 16 and a timestamp synthesized in FPGA 70. The reference data packet is assembled in the same manner as in computer 34 of reference unit 20. In the master mode, an FSK transceiver data packet is assembled (like data packet 50a) and contains the aforementioned reference data packet and a then current synthesized sync pulse and timestamp (FIG. 4). The FSK transceiver data packet is assembled in the same manner as in field unit 22. FSK transceiver 60 of detector 24' transmits the aforementioned FSK transceiver data packet (including the FSK data clock signal) over a short-range, ISM radio communications path 54' (FIG. 12), like FSK transceiver 50 does over radio path 54. The preferred ISM frequencies are as previously described for transceivers 50 and 60. Communications path 54' is generally no greater than about 450 meters and typically no greater than about 100 meters. It is more typically between about 30 and 100 meters. A 450 meter communications path may be useful for searches of leaks in a multiple dwelling unit.

In FIG. 12, leakage detector 24" is operating in the normal detection or slave mode. It receives the FSK transceiver data packet from detector 24'. The reference data packet, sync pulse and timestamp contained in the FSK transceiver data packet are routed in detector 24" from transceiver 60 to FPGA 70 via data/control line 60b and data line 60c. Again, the process is the same as described for leakage detector 24. Detector 24" operates in the same mode as detector 24 (i.e., slave). Transceiver 60 of detector 24" functions primarily as a radio receiver, in the same manner as transceiver 60 in detector 24. In detector 24", LO 88 is not activated; rather, local clock generator 62 is operative to convert (or multiply) the FSK data clock signal received from detector 24' to a 10 MHz local clock signal. As mentioned before, clock generator 62 contains or is a phase-lock loop circuit that ensures that the local clock signal is synchronized to the FSK data clock signal and thus, in turn, to the 10 MHz signal from LO 88 in detector 24'. The local clock signal in detector 24" is applied to the other elements of the detector in the same manner as in detector 24.

As shown in FIG. 12, detector 24" has an ISM band FSK antenna 61" and a leakage antenna 65". Detector 24" is preferably a handhold unit, intended to be carried around premises P' to detect and find the source of a QAM television leakage signal 18'. Leakage signal 18' is received by antenna 65" and then amplified, down-converted, lowpass filtered, and sampled in the same manner as described for leakage signal 18 in detector 24 (see FIGS. 5 and 6). Receiver 64 of detector 24" produces I and Q sets of leakage samples of leakage signal 18'. The sync pulses used to initiate the recording of the I and Q sets of leakage samples are obtained from the FSK transceiver data packets received from master detector 24'. FPGA 70 of detector 24" receives the I and Q sets of samples from receiver 64 and associates both sets with a synthesized timestamp from a then currently received FSK transceiver data packet. The leakage samples and associated timestamp are then stored in DRAM 74 of detector 24". In detector 24", when FPGA 70 receives a reference data packet from transceiver 60, the timestamp contained in that packet is compared to timestamps associated with stored sets of the leakage samples. If there is a match, then the associated I and Q sets of leakage samples are retrieved from DRAM 74. The reference samples and leakage samples with matching timestamps are then delivered to correlator 72 of detector 24". Again, this process is the same as described in connection with detector 24. The correlation processing, value determination, and displaying functions are all the same as in detector 24. Also, the method of using detector 24" to detect and locate QAM signal leaks is the same as described with respect to detector 24.

In the application of FIG. 12, a situation may occur where the leak is located upstream of reference point 15'. In anticipation of this, a small delay (e.g., 5 microseconds) may be introduced by FPGA 70 in master detector 24'. In the master mode, FPGA 70 would be programmed to apply this delay upon receiving the leading edge of a sync pulse. This would delay the recording of the reference samples of QAM television signal 16 in detector 24'. Detector 24' may be configured or programmed to allow the user to adjust the delay using buttons 80 or other user interface. Alternatively, the delay may be implemented in correlator 72 of detector 24". In the latter case, a fixed time delay is employed to effectively create a set of negative time delay channels or intervals in addition to a set of positive time delay channels or intervals. Also, in the application of FIG. 12, the number of correlation channels of correlator 72 can be significantly reduced (e.g., from 2000 to about 60-100), due to the low estimated distances between reference point 15' and the leak location about premises P'. However, it may be desirable to leave the number of correlation channels at about 2000, so that detectors 24, 24' and 24" can operate in any application.

While the preferred embodiments of the invention have been particularly described in the specification and illustrated in the drawing, it should be understood that the invention is not so limited. Many modifications, equivalents and adaptations of the invention will become apparent to those skilled in the art without departing from the spirit and scope of the invention, as defined in the appended claims.

What is claimed is:

1. An improved apparatus for finding a leak in a HFC network carrying a digital signal having a signal part, where the leak emits the digital signal including the signal part into free space as a leakage signal, said apparatus being of the type in which a reference subsystem includes a first navigation receiver, a reference receiver, a reference sampler, and a communications interface, the first navigation receiver being adapted to receive from a navigation system a reference clock signal having a frequency, the reference receiver being adapted to receive the digital signal from a reference point in the HFC network, the reference sampler being adapted to sample in synchronism with the reference clock signal the signal part of the digital signal received by the reference receiver, to form reference samples, and the communications interface being adapted to deliver the reference samples to a first communications link that includes a mobile wireless network, and in which a field subsystem includes a second navigation receiver and a wireless modem, the second navigation receiver being adapted to receive the reference clock signal from the navigation system, and the wireless modem being adapted to receive the reference samples from the mobile wireless network of the first communications link, wherein the improvement comprises:

(a) a communications bridge, associated with said field subsystem, including—
  (i) a phase lock loop frequency divider, coupled to the second navigation receiver, for dividing the frequency of the reference clock signal down to a lower frequency, to form a slower clock signal that is substantially phase-locked to the reference clock signal, and
  (ii) a radio transmitter, coupled to the frequency divider and the wireless modem, for transmitting the reference samples and the slower clock signal over a second communications link consisting essentially of a relatively short-range, radio communications path; and (b) a handheld leakage detector, excluding a receiver for a navigation system and including—

(i) a radio receiver for receiving the reference samples and the slower clock signal from the radio communications path of the second communications link, (ii) a phase lock loop clock generator, coupled to the radio receiver, for generating a local clock signal from the slower clock signal, the local clock signal being substantially phase-locked to the slower clock signal and, in turn, to the reference clock signal and having a frequency substantially equal to the frequency of the reference clock signal, (iii) a leakage receiver for receiving from free space, at a detection position, the leakage signal including the signal part, (iv) a leakage sampler, coupled to the leakage receiver and the local clock generator, for sampling the leakage signal including the signal part in synchronism with the local clock signal, to form leakage samples, (v) a correlator, coupled to the radio receiver and the leakage sampler, for performing a coherent cross-correlation of the reference samples and the leakage samples, to produce a correlation peak characterized by a parameter, (vi) a detector processor, associated with the correlator, for determining a value related to the parameter of the correlation peak, and (vii) means for indicating the value, the value generally becoming more optimized as the detection position of the leakage signal approaches the leak, whereby the leak is sought by iteratively changing the detection position relative to the leak while operating said apparatus, in an effort to optimize the value.

2. The apparatus of claim 1, wherein:

the first navigation receiver of said reference subsystem is adapted to receive from the navigation system a first sync pulse, the reference sampler of said reference subsystem forming the reference samples in response to the first sync pulse;

the second navigation receiver of said field subsystem is adapted to receive a second sync pulse from the navigation system, the radio transmitter of said communications bridge being coupled to the second navigation receiver to receive the second sync pulse and being adapted to transmit the second sync pulse over the radio communications path of the second communications link; and the radio receiver of said handheld leakage detector is adapted to receive the second sync pulse from the radio communications path of second communications link, the leakage sampler of said leakage detector forming the leakage samples in response to the second sync pulse.

3. The apparatus of claim 2, wherein:

said reference subsystem further includes a first processor coupled to the first navigation receiver, the reference sampler and the communications interface, the first navigation receiver being adapted to receive from the navigation system a first timestamp associated with the first sync pulse, the first processor being programmed to associate the first timestamp with the reference samples and to assemble a reference data packet containing the first timestamp and the reference samples, the communication interface being adapted to deliver the reference data packet to the first communications link;

the wireless modem of said field subsystem being adapted to receive the reference data packet from the mobile wireless network, the second navigation receiver of said field subsystem being adapted to receive a second timestamp from the navigation system, the radio transmitter of said field subsystem being adapted to transmit the reference data packet and the second timestamp over the radio communications path of the second communications link; and the radio receiver of said leakage detector is adapted to receive the reference data packet and the second timestamp from the radio communications path of the second communications link, the detector processor being coupled to the radio receiver and the leakage sampler and being programmed to associate the second timestamp with the leakage samples, the detector processor being further programmed to deliver the reference samples of the reference data packet and the leakage samples to the correlator for cross-correlation if the first timestamp of the reference data packet is the same as the second timestamp.

4. The apparatus of claim 2, wherein the signal part of the digital signal spans a reference time interval and propagates between the reference point in the HFC network and said leakage detector within a propagation time interval, and wherein the leakage sampler of said leakage detector forms the leakage samples over a leakage time interval, the start of the leakage time interval being delayed by a delay interval triggered by the second sync pulse, the leakage time interval having a duration of at least the reference time interval plus the propagation time interval minus the delay interval.

5. The apparatus of claim 1, wherein the navigation system is a satellite navigation system and the first and the second navigation receivers are satellite navigation receivers.

6. The apparatus of claim 1, wherein the HFC network includes a fiber optic node, the reference point in the HFC network being located at about the fiber optic node.

7. The apparatus of claim 1, wherein the lower frequency of the slower clock signal is between about 9 KHz and about 385 KHz.

8. The apparatus of claim 1, wherein the radio transmitter of said communications bridge is a FSK transceiver that transmits the reference samples and the slower clock signal over an ISM band of frequencies, and wherein the radio receiver of said leakage detector is a FSK transceiver that receives the reference samples and the slower clock signal over the ISM band of frequencies.

9. The apparatus of claim 8, wherein the ISM band of frequencies is within a range selected from the group consisting of 902 MHz to 928 MHz, 862 MHz to 870 MHz, and 431 MHz to 464 MHz.

10. The apparatus of claim 1, wherein the parameter characterizing the correlation peak is an amplitude of the correlation peak, and wherein the value is a relative strength of the leakage signal.

11. The apparatus of claim 1, wherein the parameter characterizing the correlation peak is an amplitude of the correlation peak, and wherein the value is a field strength of the leakage signal.

12. The apparatus of claim 1, wherein the parameter characterizing the correlation peak is a time delay, and wherein the value is a relative distance between the detection position of the leakage signal and the leak.

13. The apparatus of claim 1, wherein the digital signal is a QAM television signal.

14. The apparatus of claim 1, wherein said handheld leakage detector excludes a wireless modem for a mobile wireless network.

15. The apparatus of claim 14, wherein the radio transmitter of said communications bridge and the radio receiver of said leakage detector are FSK transceivers that communicate with each other in an ISM band of frequencies over the radio communications path of the second communications link.

16. A system for finding a leak in a coaxial cable portion of a HFC network carrying a digital QAM television signal having a signal part, where the leak emits the QAM signal including the signal part into free space as a leakage signal, said system comprising:
  (a) a reference subsystem, including
    (i) a first satellite receiver for receiving from a satellite navigation system a first sync pulse, a first timestamp, and a reference clock signal having a frequency,
    (ii) a reference receiver, adapted to be coupled to a reference point in the HFC network, for receiving the QAM signal carried on the HFC network,
    (iii) a reference sampler, coupled to the first satellite receiver and the reference receiver, for sampling the signal part of the QAM signal, to form reference samples, the reference sampler sampling the signal part in response to the first sync pulse and in synchronism with the reference clock signal,
    (iv) a reference processor, coupled to the first satellite receiver and the reference sampler and programmed to assemble a reference data packet containing the first time-stamp and the reference samples, and
    (v) a communications interface, coupled to the reference processor, for delivering the reference data packet to a first communications link including a mobile wireless network;
  (b) a field-deployable subsystem including—
    (i) a second satellite receiver for receiving from the satellite navigation system a second sync pulse, a second timestamp, and the reference clock signal, and
    (ii) a phase lock loop frequency divider, coupled to the second satellite receiver, for dividing the frequency of the reference clock signal down to a lower frequency, to form a slower clock signal that is substantially phase-locked to the reference clock signal,
    (iii) a wireless modem for receiving the reference data packet from the mobile wireless network of the first communications link, and
    (iv) an FSK transmitter, coupled to the second satellite receiver, the frequency divider and the wireless modem, for transmitting in an ISM band the second sync pulse, the second timestamp, the slower clock signal, and the reference data packet, over a relatively short-range, radio communications path; and
  (c) a handheld leakage detector, excluding a satellite receiver for a satellite navigation System and including—
    (i) an FSK receiver, tuned to the ISM band, for receiving from the radio communications path the second sync pulse, the second timestamp, the slower clock signal, and the reference data packet,
    (ii) a phase lock loop clock generator, coupled to the FSK receiver, for generating a local clock signal from the slower clock signal, the local clock signal being substantially phase-locked to the slower clock signal and, in turn, to the reference clock signal and having a frequency substantially equal to the frequency of the reference clock signal,
    (iii) a detector processor, coupled to the FSK receiver, for receiving the second sync pulse, the second timestamp, and the reference data packet,
    (iv) a leakage receiver for receiving from free space, at a detection position, the leakage signal including the signal part,
    (v) a leakage sampler, coupled to the leakage receiver, the detector processor, and the local clock generator, for sampling the leakage signal including the signal part in response to the second sync pulse and in synchronism with the local clock signal, to form leakage samples, the detector processor being programmed to associate the second timestamp with the leakage samples,
    (vi) a correlator associated with the detector processor, the detector processor being further programmed to deliver to the correlator the reference samples of the reference data packet and the leakage samples if a condition is met that the first timestamp of the reference data packet is the same as the second timestamp, the correlator performing a coherent cross-correlation of the reference samples and the leakage samples if the condition is met, to produce a correlation peak characterized by a parameter,
    (vii) means, associated with the correlator, for determining a value related to the parameter of the correlation peak, and
    (viii) means for indicating the value, the value generally becoming more optimized as the detection position of the leakage signal approaches the leak,
    whereby the leak is sought by iteratively changing the detection position relative to the leak while operating said system, in an effort to optimize the value.

17. The apparatus of claim 16, wherein said handheld leakage detector excludes a wireless modem for a mobile wireless network.

18. A method of finding a leak in a coaxial cable portion of a HFC network carrying a digital signal having a signal part, where the leak emits the digital signal including the signal part into free space as a leakage signal, said method comprising the steps of:
  (a) at a local position, receiving from a reference point in the HFC network the signal part of the digital signal;
  (b) at the local position, receiving from a navigation system a reference clock signal having a frequency;
  (c) sampling in synchronism with the reference clock signal the signal part received in step (a), to form a set of reference samples;
  (d) at the local position, transmitting the set of reference samples over a first communications link that includes a mobile wireless network;
  (e) at a remote position along the HFC network, receiving the set of reference samples from the mobile wireless network;
  (f) at the remote position, receiving the reference clock signal from the navigation system;
  (g) dividing the frequency of the reference clock signal received in step (f) to a lower frequency, to form a slower clock signal that is substantially phase locked to the reference clock signal received in step (f);
  (h) at the remote position, transmitting the set of reference samples and the slower clock signal over a second communications link consisting essentially of a relatively short-range, radio communications path;
  (i) at a detection position, receiving from free space the leakage signal including the signal part;
  (j) at the detection position, receiving the set of reference samples and the slower clock signal from the radio communications path of the second communications link;
  (k) at the detection position, generating from the slower clock signal a local clock signal having a frequency substantially equal to the frequency of the reference clock signal received in step (f) and being substantially phase-locked to the slower clock signal and, in turn, to the reference clock signal received in step (f);

(l) at the detection position, sampling the leakage signal including the signal part in synchronism with the local clock signal, to form a set of leakage samples;

(m) at the detection position, performing a coherent cross-correlation of the set of reference samples and the set of leakage samples, to produce a correlation peak characterized by a parameter;

(n) at the detection position, determining a value related to the parameter of the correlation peak, the value generally becoming more optimized as the detection position of the leakage signal approaches the leak; and (o) at the detection position, indicating the value, whereby the leak is sought by iteratively changing the detection position relative to the leak while repeating steps (a) through (o), in an effort to optimize the value.

19. The method of claim 18, further comprising the steps of:

(p) moving to a second detection position and repeating steps (a) through (n) with respect to the second detection position and a second signal part of the digital signal;

(q) indicating any change in the value between what was originally determined in step (n) and what was determined in step (p);

(r) moving to a third detection position and repeating steps (a) through (n) with respect to the third detection position and a third signal part of the digital signal;

(s) indicating any change in the value between what was determined in step (p) and what was determined in step (r); and (t) if necessary, moving to successive detection positions and successively repeating steps (a) through (n), with respect to the successive detection positions and successive signal parts of the digital signal, respectively, until a substantially optimized value is obtained or the leak is found.

20. The method of claim 18, wherein steps (b) and (f) include receiving the reference clock signal from a satellite navigation system.

21. The method of claim 20, wherein step (i) includes receiving the leakage signal using a leakage detector that does not include a satellite receiver for a satellite navigation system or a wireless modem for a mobile wireless network.

22. The method of claim 18, wherein:

step (b) further includes receiving a first sync pulse from the navigation system;

step (c) includes forming the set of reference samples in response to the first sync pulse;

step (f) further includes receiving a second sync pulse from the navigation system;

step (h) includes transmitting the second sync pulse over the radio communications path of the second communications link;

step (j) includes receiving the second sync pulse from the radio communications path of the second communications link; and step (l) includes forming the set of leakage samples in response to the second sync pulse received in step (j).

23. The method of claim 22, wherein:

step (b) includes receiving from the navigation system a first timestamp associated with the sync pulse;

step (c) includes associating the first timestamp with the set of reference samples;

step (d) includes transmitting the first timestamp together with the set of reference samples over the first communications link;

step (e) includes receiving the first timestamp together with the set of reference samples from the mobile wireless network;

step (f) includes receiving a second timestamp from the navigation system;

step (h) includes transmitting the first timestamp together with the set of reference samples and the second timestamp over the radio communications path of the second communications link;

step (j) includes receiving the first timestamp together with the set of reference samples and the second timestamp from the radio communications path;

step (l) includes associating the second timestamp with the set of leakage samples; and step (m) is performed if the first and the second timestamps are the same.

24. The method of claim 22, wherein the signal part of the digital signal spans a reference time interval and the signal part propagates between the reference point in the HFC network and the detection position during a propagation time interval; and wherein step (l) includes forming the leakage samples over a leakage time interval, the start of the leakage time interval being delayed by a delay interval triggered by the second sync pulse, the leakage time interval having a duration of at least the reference time interval plus the propagation time interval minus the delay interval.

25. The method of claim 18, wherein the leak in the coaxial cable portion of the HFC network is located at the subscriber premises.

26. The method of claim 18, wherein step (h) includes transmitting the set of reference samples and the slower clock signal in an ISM band of frequencies, and wherein step (j) includes receiving the set of reference samples and the slower clock signal over the ISM band of frequencies.

27. The method of claim 18, wherein the parameter characterizing the correlation peak is an amplitude of the correlation peak, and wherein step (n) includes determining a relative strength of the leakage signal based the amplitude of the correlation peak.

28. The method of claim 18, wherein the parameter characterizing the correlation peak is an amplitude of the correlation peak, and wherein step (n) includes determining a field strength of the leakage signal based the amplitude of the correlation peak.

29. The method of claim 18, wherein the parameter characterizing the correlation peak is a time delay, and wherein step (n) includes determining a relative distance between the detection position of the leakage signal and the leak based on the time delay.

30. The method of claim 18, wherein the digital signal is a QAM television signal.

31. A handheld leakage detector for finding a leak in a coaxial cable portion of a HFC network carrying a digital QAM television signal having a signal part, the leak emitting the QAM signal including the signal part into free space as a QAM leakage signal, said leakage detector excluding a receiver for a navigation system and comprising:

(a) a housing configured and dimensioned to be conveniently held in the hand by a user;

(b) a radio receiver, mounted in said housing, for receiving a radio data packet over a relatively short-range radio communications path in an ISM band of frequencies, the radio data packet containing reference samples, a first timestamp associated with the reference samples, a second timestamp, a sync pulse, and a data clock signal, the reference samples being digital samples of the QAM signal carried in the HFC network and being formed in synchronism with a reference clock signal received from a navigation system, the data clock signal being phase locked to the reference clock signal;

(c) a phase lock loop clock generator, mounted in said housing and coupled to said radio receiver, for generating from the data clock signal a local clock signal having substantially the same frequency as the reference clock signal and being substantially phase locked to data clock signal and, in turn, to the reference clock signal;

(d) a leakage receiver, mounted in said housing, for receiving from free space, at a detection position, the QAM leakage signal including the signal part;

(e) a leakage sampler, mounted in said housing and coupled to said leakage receiver, for sampling the QAM leakage signal including the signal part, to form leakage samples, the leakage samples being formed in synchronism with the local clock signal;

(f) a processor, mounted in said housing and coupled to said radio receiver, said clock generator, and said leakage sampler, for receiving the first timestamp and the associated reference samples, the second timestamp, the sync pulse, and the leakage samples, said processor being programmed to associate the second timestamp with the leakage samples;

(g) a correlator associated with the processor, said processor being further programmed to deliver to said correlator the reference samples and the leakage samples if a condition is met that the first and the second timestamps are the same, said correlator performing a coherent cross-correlation of the reference samples and the leakage samples if the condition is met, to produce a correlation peak characterized by a parameter;

(h) means, associated with the correlator, for determining a value related to the parameter of the correlation peak, the value generally becoming more optimized as the detection position of the QAM leakage signal approaches the leak; and (i) means for indicating the value, whereby the leak is sought by iteratively changing the detection position relative to the leak while operating said leakage detector until the value becomes substantially optimized or the leak is found.

32. The leakage detector of claim 31, wherein said radio receiver is an FSK receiver.

33. The leakage detector of claim 31, wherein the ISM band of frequencies is within a range selected from the group consisting of 902 MHz to 928 MHz, 862 MHz to 870 MHz, and 431 MHz to 464 MHz.

34. The leakage detector of claim 31, further excluding a wireless modem for a mobile wireless network.

35. The leakage detector of claim 31, wherein the parameter characterizing the correlation peak is an amplitude of the correlation peak, and wherein the value is a relative strength of the QAM leakage signal.

36. The leakage detector of claim 31, wherein the parameter characterizing the correlation peak is an amplitude of the correlation peak, and wherein the value is a field strength of the QAM leakage signal.

37. The leakage detector of claim 31, wherein the parameter characterizing the correlation peak is a time delay, and wherein the value is a relative distance between the detection position of the QAM leakage signal and the leak.

* * * * *